United States Patent
Kempka

(10) Patent No.: US 9,830,165 B2
(45) Date of Patent: *Nov. 28, 2017

(54) USB COMMUNICATIONS TUNNELING THROUGH USB PRINTER DEVICE CLASS

(71) Applicant: MIDNIGHT MOSAIC LLC, Pine River, MN (US)

(72) Inventor: Anthony Kempka, Backus, MN (US)

(73) Assignee: MIDNIGHT MOSAIC LLC, Pine River, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,703

(22) Filed: Oct. 6, 2015

(65) Prior Publication Data

US 2016/0026476 A1 Jan. 28, 2016

Related U.S. Application Data

(63) Continuation of application No. 14/205,262, filed on Mar. 11, 2014, now Pat. No. 9,182,996.

(60) Provisional application No. 61/777,327, filed on Mar. 12, 2013.

(51) Int. Cl.
| | |
|---|---|
| *G06F 15/00* | (2006.01) |
| *G06F 9/44* | (2006.01) |
| *G06F 13/10* | (2006.01) |
| *G06F 13/38* | (2006.01) |

(52) U.S. Cl.
CPC .......... *G06F 9/4413* (2013.01); *G06F 13/102* (2013.01); *G06F 13/387* (2013.01)

(58) Field of Classification Search
CPC ..... G06F 3/1237; G06F 3/1293; G06F 3/1203
USPC ............................................... 358/1.16–1.18
See application file for complete search history.

(56) References Cited

U.S. PATENT DOCUMENTS

| | | |
|---|---|---|
| 7,177,927 B1 | 2/2007 | Watanabe |
| 7,184,922 B2 | 2/2007 | Ousley et al. |
| 7,346,729 B2 | 3/2008 | Watanabe |
| 7,827,258 B1 | 11/2010 | Kalbarga |
| 7,979,264 B2 | 7/2011 | Kahn et al. |

(Continued)

OTHER PUBLICATIONS

Universal Serial Bus Device Class Definition for Printing Devices, version 1.1, Jan. 2000.
Universal Serial Bus Specification, Revision 2.0, Apr. 27, 2000.

*Primary Examiner* — Saeid Ebrahimi Dehkordy
(74) *Attorney, Agent, or Firm* — Cardle Patent Law Chtd.

(57) ABSTRACT

A USB tunnel apparatus is disclosed herein. In various aspects, the USB tunnel apparatus may include a USB printer class interface operatively received by an application specific USB peripheral. The USB printer class interface is configured to identify the application specific USB peripheral as a printer class device to the host during Plug and Play enumeration, and the USB printer class interface is configured to generate a response during Plug and Play enumeration that alters the process of PnP enumeration to create a partially instantiated printer driver stack on the host when the application specific USB peripheral is in USB communication with the host, in various aspects. Related methods and compositions of matter are also disclosed. This Abstract is presented to meet requirements of 37 C.F.R. §1.72(b) only. This Abstract is not intended to identify key elements of the apparatus, methods, and compositions of matter disclosed herein or to delineate the scope thereof.

15 Claims, 10 Drawing Sheets

(56) References Cited

U.S. PATENT DOCUMENTS

| | | |
|---|---|---|
| 8,006,009 B2 | 8/2011 | Gouraud |
| 8,010,959 B2 | 8/2011 | Mullis, II et al. |
| 8,131,896 B2 | 3/2012 | Yamagata |
| 8,151,345 B1 | 4/2012 | Yeager |
| 8,171,502 B2 | 5/2012 | Mullis, II et al. |
| 8,190,782 B2 | 5/2012 | Ichieda |
| 8,214,888 B2 | 7/2012 | Noe et al. |
| 8,250,244 B2 | 8/2012 | Deforche et al. |
| 9,182,996 B2 * | 11/2015 | Kempka ............... G06F 9/4413 |
| 2004/0098596 A1 | 5/2004 | Elleto et al. |
| 2007/0046972 A1 * | 3/2007 | Hirai .................... G06F 3/1204 358/1.13 |
| 2008/0126584 A1 | 5/2008 | Mullis et al. |
| 2008/0239378 A1 * | 10/2008 | Uno .................... G06F 9/4411 358/1.15 |
| 2009/0030382 A1 | 1/2009 | Brandt et al. |
| 2009/0187687 A1 | 7/2009 | Hulbert et al. |

\* cited by examiner

USB COMMUNICATIONS TUNNELING THROUGH USB PRINTER DEVICE CLASS

CROSS-REFERENCE TO RELATED APPLICATIONS

The present application is a continuation of U.S. patent application Ser. No. 14/205,262 filed 11 Mar. 2014 that, in turn, claims priority and benefit of U.S. Provisional Patent Application No. 61/777,327 filed on 12 Mar. 2013, which is hereby incorporated by reference in its entirety herein.

BACKGROUND OF THE INVENTION

Field

This application relates to methods of establishing communications between an application specific USB peripheral and a host. More specifically, the application relates to methods for performing general purpose USB communications between the application specific USB devices and the hosts wherein the host may have various hardware configurations and the host may execute various operating systems.

Related Art

Universal Serial Bus (USB) is a serial bus interface between a host computer and a peripheral device conforming to the USB specification. The USB Implementers Forum (USB-IF) defines the USB specification including, for example, mechanical connectors, wiring, electrical characteristics, communications protocols, and even the embossed logos. USB-IF is organized as USB IMPLEMENTERS FORUM, INC. an Oregon nonprofit mutual benefit corporation, with materials available at http://www.usb.org/. In particular, the USB serial bus specification found in USB-IF documented entitled USB_20.PDF and USB-IF Printer class protocol specification found in USBPRINT11.PDF from the USB-IF.

Host, as used herein, includes, for example, a single-processor computer, multiprocessor computer, multi-core computer, minicomputers, mainframe computer, supercomputers, distributed computers, personal computer, hand-held computing devices, tablet, smart phone, gaming consoles, gaming devices, smart TV, USB enabled stereo receiver, set top box devices, DVD players, CD players, Blu-ray players, personal digital assistant (PDA), point of sale (POS) terminals, programmable logic controllers (PLC), embedded computers, single board computer (SBC), network routers, network firewalls, network devices, virtual machines, virtual machine monitors (VMM), and hypervisors. The host may be configured to include memory, screen, keyboard, mouse, storage devices, and so forth, in various aspects. The host may execute various host operating systems (host OS) such as, for example, Microsoft Windows, Linux, UNIX, MAC OS X, real time operating system (RTOS), VxWorks, INTEGRITY, Android, iOS, or a monolithic software or firmware implementation without a defined traditional operating system.

Application specific USB peripheral, as used herein, includes specialized non-printer devices such as data acquisition equipment, industrial controls, SCADA, scientific equipment, encryption devices, communications electronics, mass data storage, radio frequency devices, information displays, cryptographic accelerators, global position systems (GPS), global navigation satellite systems (GNSS), cellular communications equipment, user input devices, biometric devices, in-circuit-emulators, software debuggers, operating system debuggers, FLASH device programmers, virtual peripherals, smart grid equipment, power line communications devices, medical instrumentation, exercise equipment, software protection dongles, thermometers, uninterruptable power supplies, audio controls, lighting equipment, telephony devices, motion control, robotics, various sensors, configured to communicate with the host via USB. Application specific USB peripheral, as used herein, excludes printers.

USB is considered a master-slave bus architecture. The host (the master) controls communications with the application specific USB peripheral (the slave) and the host controls the operations of the application specific USB peripheral. The application specific USB peripheral cannot communicate or be controlled via the USB bus without a host controlling the USB bus. An application specific controller executing on the host may control the operation of the application specific USB peripheral, the application specific controller may send data to the application specific USB peripheral, and the application specific controller may receive data from the application specific USB peripheral, and the application specific controller may process data received from the application specific USB peripheral.

In some aspects, the application specific controller executing on the host communicates with the application specific USB peripheral using the Application Specific or Vendor Specific classes (USB class codes 0xFE and 0xFF hexadecimal). In such aspects, an application specific USB peripheral driver interfaces the application specific USB peripheral with the host including the application specific controller. The application specific USB peripheral driver may be implemented in software operatively received by the host. However, the application specific USB peripheral driver may be difficult or costly to implement and maintain. For example, each different host operating system requires a corresponding distinct application specific USB peripheral driver. Accordingly, distinct application specific USB peripheral drivers would need to be provided for a various hosts executing, for example, Microsoft Windows, Linux, or MAC OS X. Different operating system versions or revisions may require different application specific USB peripheral drivers. For example, the application specific USB peripheral driver for a host executing Windows XP differs from the application specific USB peripheral driver for a host executing Windows 7 64-bits. As the operating system is updated, the application specific USB peripheral driver may require updating as well.

Data transfer rates for an application specific USB peripheral using the vendor specific class or the application specific class and corresponding application specific USB peripheral driver may be dependent upon dependent on USB bus speed. The different USB bus speeds are low speed (LS), full speed (FS), high speed (HS) and Super Speed (SS), in various aspects. The different speed ratings in megabits per second (Mbps) defined for USB 2.0 are: LS 1.5 Mbps, FS 12 Mbps, HS 480 Mbps. The USB 3.0 SS is 5 gigabits per second (Gbps). Data transfer rates for the application specific USB peripheral using the vendor specific class or the application specific class and corresponding application specific USB peripheral driver may be estimated as approximately 169 KB/second for LS, 1.35 MB/second for FS, and 54 MB/second for HS (estimates=0.9×USB bus speed/8.0).

In other aspects, the application specific USB peripheral may be interfaced with the host using the USB Human Interface Device (HID) Class (USB class code 0x03 hexadecimal). Use of the USB HID class often does not require writing an application specific USB peripheral driver. Many computer operating systems support USB HID class including Microsoft Windows, Linux, and Mac OS X. The USB HID class definition contains provisions to support general purpose (or generic) communications to/from an application specific USB peripheral.

However, the USB HID class was designed to accept user inputs from devices such as a keyboard or a mouse. A user, for example, may type 2 characters per second or less. Because of the intended usage, the USB HID class interface is slow and is considered quite low performance and limiting in function. For example, a theoretical maximum data transfer rate through the USB HID class is 64 KB/second because data transfer is limited to 64 byte USB data packets at a maximum of 1,000 times per second regardless of the USB bus speed. Practical implementations of the USB HID class may be less than this theoretical maximum data transfer rate, for example, a data transfer rate of less than 50 KB/second. Thus, USB HID class may be too slow for many application specific USB peripherals. The alternative to using the USB HID class is using the vendor specific class or the application specific class and corresponding application specific USB peripheral driver, therefore developing and supporting costly and difficult application specific USB peripheral drivers.

Accordingly, there is a need for improved apparatus as well as related methods for connecting an application specific USB peripheral to a host.

BRIEF SUMMARY OF THE INVENTION

These and other needs and disadvantages may be overcome by the apparatus and related methods and compositions of matter disclosed herein. Additional improvements and advantages may be recognized by those of ordinary skill in the art upon study of the present disclosure.

A USB tunnel apparatus is disclosed herein. In various aspects, the USB tunnel apparatus may include USB printer class interface operatively received by an application specific USB peripheral. The USB printer class interface is configured to identify the application specific USB peripheral as a printer class device to the host during Plug and Play enumeration, and the USB printer class interface is configured to generate a response during Plug and Play enumeration that alters the process of Plug-n-Play (PnP) enumeration to create a partially instantiated printer driver stack on the host when the application specific USB peripheral is in USB communication with the host, in various aspects.

Related methods are disclosed herein. In various aspects, the methods may include the step of identifying an application specific USB peripheral as a printer class device to a host during Plug and Play enumeration, and the step of generating a response during Plug and Play enumeration that alters the process of PnP enumeration thereby creating a partially instantiated printer driver stack on the host.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
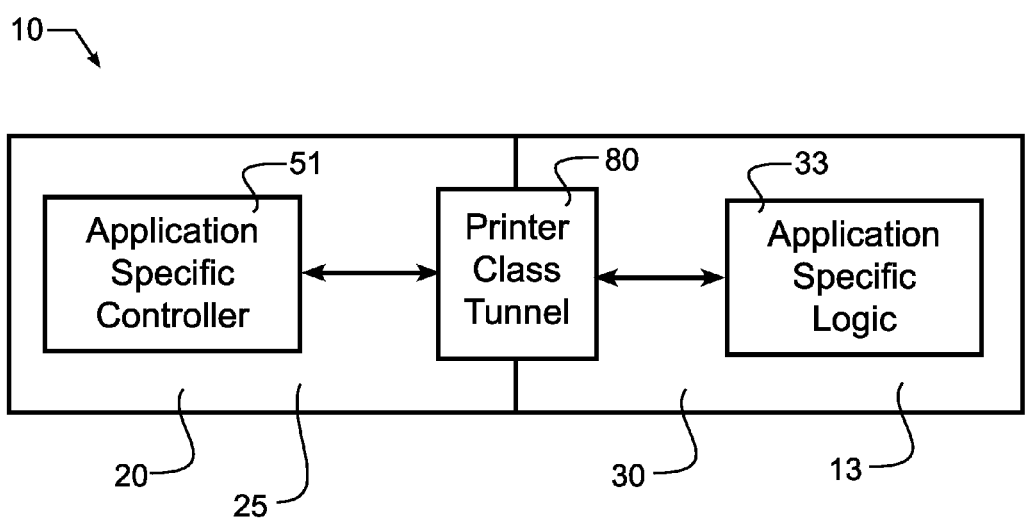
FIG. 1 illustrates by schematic diagram an exemplary implementation of a USB tunnel apparatus.

The Figures are exemplary only, and the implementations illustrated therein are selected to facilitate explanation. The Figures including the apparatus, processes, and compositions of matter illustrated in the Figures are not to be considered limiting unless expressly so stated. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The steps in the various processes illustrated in the Figures may be performed, for example, in other orders or the steps may be divided or subdivided in various ways, in other implementations. Information flows and process flows in the Figures included herein are indicated by arrows, and it should be understood that additional information flows may occur between various components and that other process flows may occur, in various other implementations. Where used in the various Figures, the same numerals designate the same or similar elements. When positional terms and other terms such as "top," "bottom," "right," "left," "forward," "rear," "first," "second," "inside," "outside," are used, such terms should be understood in reference to the orientation of the implementations shown in the Figures and are utilized only to facilitate description of the Figures. Relative terms such as "about" or "approximately" may be defined in terms of standard engineering tolerances as would be understood by those of ordinary skill in the art. These engineering tolerances, for example, may be ±1%, ±2.5%, or ±5%, in various implementations.

DETAILED DESCRIPTION OF THE INVENTION

A USB tunnel and associated methods and compositions of matter are disclosed herein. In various aspects, the USB tunnel includes an application specific controller executing on a host communicating through a printer class tunnel with application specific logic on an application specific USB peripheral. Data may be communicated from the application specific controller to the application specific logic through the printer class tunnel, or data may be communicated from the application specific logic through the printer class tunnel to the application specific controller, in various aspects.

The printer class tunnel, in various aspects, includes a partially instantiated printer driver stack in the host. No printer object is instantiated to the partially instantiated printer driver stack. Because the host OS does not establish a printer object, various software, such as language monitors, print spooler, and printer driver, are not connected to the partially instantiated printer driver stack.

Responses from logic on the application specific USB peripheral create the partially instantiated printer driver stack during the host's Plug-n-Play (PnP) enumeration of the application specific USB peripheral, in various aspects. The application specific USB peripheral may include a USB printer class interface that transmits certain response(s) or omits transmitting certain response(s) to the host during PnP enumeration to create the partially instantiated printer driver stack. The host OS may include a host tunnel interface, and the host tunnel interface may intercept the partially instantiated printer driver stack during the creation of the printer class tunnel, in various aspects.

The methods disclosed herein may include methods of creating the USB tunnel including the printer class tunnel, and the methods disclosed herein may include methods of transmitting data between application specific controller on the host and application specific logic on the application specific USB peripheral through the printer class tunnel. In various aspects, the methods of creating a USB tunnel may include the steps of creating a partially instantiated printer driver stack by altering the process of complete PnP enumeration, intercepting the partially instantiated printer driver stack, connecting to the partially instantiated printer driver stack in the host OS using system available object access, and interfacing application specific controller on the host with the application specific logic on the application specific USB peripheral via the printer class tunnel including the USB printer class protocol driver of the host OS, which forms part of the partially instantiated printer driver stack. Note that when the process of PnP enumeration is altered, no printer is found, thus creating a partially instantiated printer driver stack.

The methods disclosed herein may include the steps of finding the partially instantiated printer driver stack and attaching application specific controller to the partially instantiated printer driver stack. The methods of data transmission may include passing data through the printer class tunnel between the application specific controller operating on the host and the application specific logic operating on application specific USB peripheral, and the methods of data transmission may include encapsulating data for transmission through the printer class tunnel.

The compositions of matter disclosed herein include computer readable media storing a computer program, the computer program including instructions that, when executed, cause the host, the application specific USB peripheral or both to perform at least some of the operations disclosed herein. The computer readable media may form at least portions of the USB tunnel disclosed herein when operably received by the host, the USB peripheral, or both the host and the USB peripheral. Computer readable media, as used herein, may include any non-transitory media that may be operably received by the computer. For example, computer readable media includes, for example, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium that may be used to store the information and that may be operably received by the computer.

The USB printer class is defined in the USB-IF printer class protocol specification document titled "Universal Serial Bus Device Class Definition for Printing Devices," and the underlying USB bus specification is found in the document titled "Universal Serial Bus Specification." The USB-IF Printer class protocol is described in, for example, the USB-IF document entitled "USBPRINT11.PDF" and the USB serial bus specification is found in, for example, the USB-IF documented entitled "USB_2.0.PDF." Both USBPRINT11.PDF and USB_2.0.PDF, which are available from USB-IF, are hereby incorporated by reference in their entirety herein. In various aspects, the USB tunnel and associated methods and compositions of matter disclosed herein leverage the USB-IF Printer class protocol (USB class code 0x07 hexadecimal) in lieu of the HID class (USB class code 0x03 hexadecimal) or Application Specific class or Vendor Specific class (USB class codes 0xFE and 0xFF hexadecimal respectively).

The application specific USB peripheral, in various aspects, may communicate with the application specific controller through the printer class tunnel at a theoretical maximum data transfer rate of approximately 60 MB/second for USB 2.0 HS bus connections with an effective data transfer rate of approximately 54 MB/second, which is well over 500 times faster than the USB HID class communications maximum speed of 64 KB/second. The printer class tunnel, in various aspects, can operate at the same effective bus transfer rates as the Application Specific of Vendor Specific USB class implementations using application specific USB peripheral drivers and can achieve approximately 169 KB/second for LS, 1.35 MB/second for FS, and 54 MB/second for HS USB bus speeds.

PnP is the process of supporting connectivity, configuration, and management of the application specific USB peripheral by the host OS, including loading necessary device drivers and building the driver stack required by the host to operate and communicate with the USB peripheral. PnP interfaces may include USB, IEEE-1394, PCI, PCI Express, and PCMCIA. Although PnP may have originally implied the specifications and features defined by Microsoft Windows operating systems, PnP is now considered universal. Other operating systems such as Linux or Mac OS X utilize a near identical PnP process since the application specific USB peripheral interface specifications are independent of the Windows OS, yet need to be configured and managed by a host OS in order to support connectivity with the application specific USB peripheral. For example, Linux commonly calls these Hot-Pluggable devices. For the purposes of this disclosure, the PnP process is that which is applicable to most operating systems.

FIG. 1 illustrates an implementation of USB tunnel 10 including printer class tunnel 80. As illustrated in FIG. 1, application specific controller 51 executes on host 20, and application specific logic 33 is operably received by application specific USB peripheral 30. Application specific controller 51 communicates with application specific logic 33 via printer class tunnel 80 to allow data communication between application specific controller 51 on host 20 and application specific logic 33 on application specific USB peripheral 30, as illustrated. Portions of printer class tunnel 80 are included on both host 20 and application specific USB peripheral 30, as illustrated, and printer class tunnel 80 forms as least part of the communication pathway between application specific controller 51 and application specific logic 33.

Figure 2:
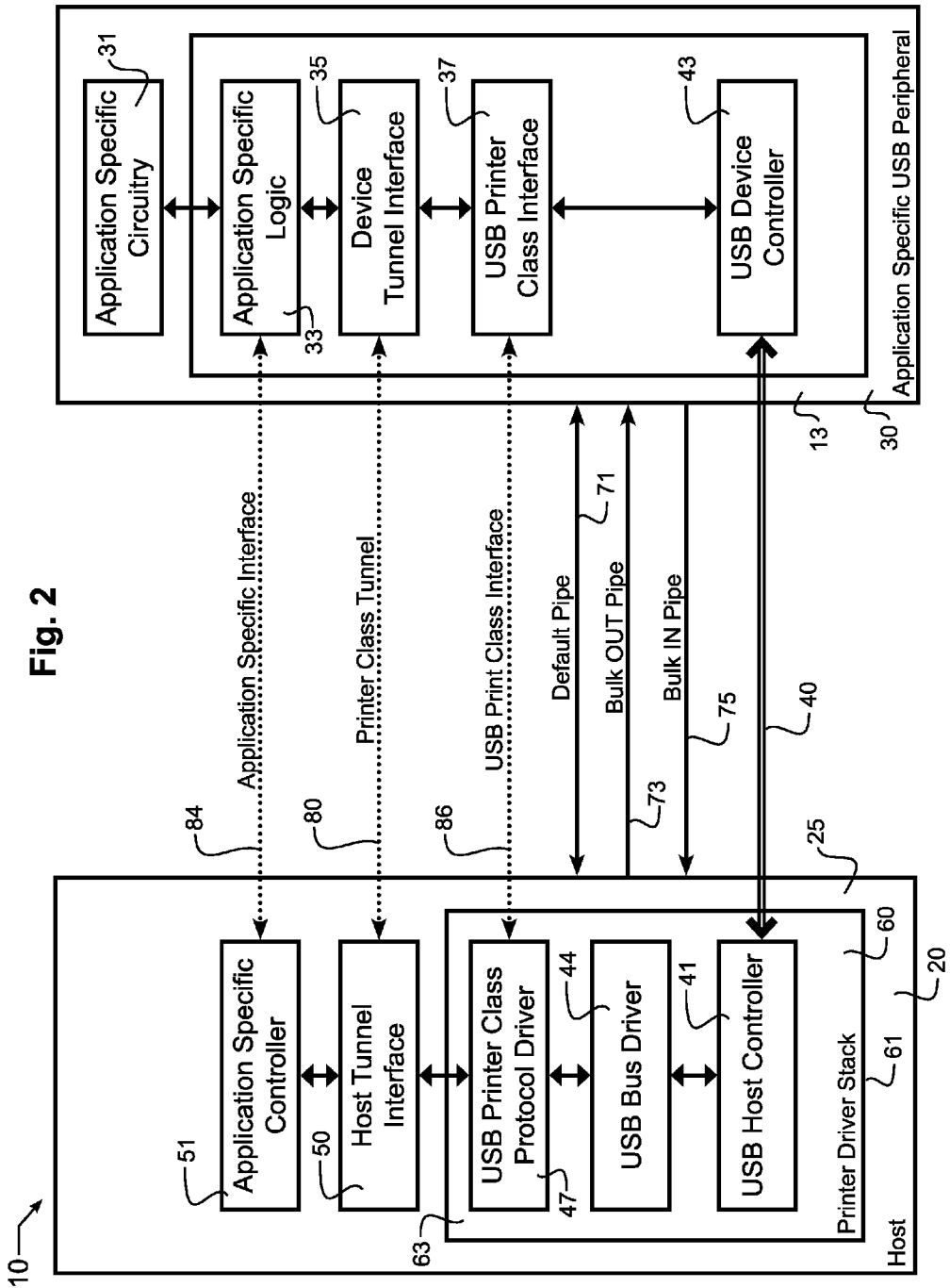
FIG. 2 illustrates by schematic diagram the exemplary implementation of the USB tunnel apparatus of FIG. 1.

FIG. 2 further illustrates USB tunnel 10 including application specific USB peripheral 30, host 20, and printer class tunnel 80. Application specific USB peripheral 30, as illustrated in FIG. 2, includes application specific circuitry 31, application specific logic 33, device tunnel interface 35, USB printer class interface 37, and USB device controller 43.

In the implementation of FIG. 2, application specific circuitry 31 may be, for example, an electrical, electro-mechanical, or electro-optical portion of application specific USB peripheral 30 that performs the function of the application specific USB peripheral 30. Application specific circuitry 31 may include physical elements such as a robotic arm adapted to carry out certain tasks. Application specific circuitry may form a sensor that detects temperature, pressure, velocity, acceleration, location, light intensity, color, electrical resistivity, voltage, or radiation intensity. As further examples, application specific circuitry 31 may include a data input device such as a magnetic strip reader that reads the magnetic strip on a credit card, or application specific circuitry 31 may include a data output device to output data from applications specific circuitry onto a data storage device such as a magnetic strip.

Application specific logic 33, in the implementation of FIG. 2, is operably connected with application specific circuitry 31. Application specific logic 33, for example, may control the operation of application specific circuitry 31, application specific logic 33 may obtain data from application specific circuitry 31, or application specific logic 33 may transmit data to application specific circuitry 31. The data obtained by application specific logic 33 from application specific circuitry 31 may be indicative of the status of application specific circuitry, may be indicative of operations of the application specific circuitry 31, or may be input into application specific circuitry 31 from an external source such as a magnetic strip Application specific circuitry 31 may include analog to digital converter to convert data from analog signals into digital data with the digital data then communicated from application specific circuitry 31 to application specific logic 33. Application specific circuitry 31 may include a digital to analog converter to convert digital data communicated from application specific logic 33 to analog signals within application specific circuitry.

Device tunnel interface 35 communicates with USB printer class interface 37 and device tunnel interface 35 communicates with application specific logic 33 to provide an interface for data transfer between USB printer class interface 37 and application specific logic 33. Device tunnel interface 35 provides the interface to printer class tunnel 80 within application specific USB peripheral 30, in this implementation.

USB printer class interface 37 provides the logic that implements the USB-IF printer class protocol specification in part on application specific USB peripheral 30. The USB printer class interface 37 may deviate from the USB-IF printer class protocol specification by identifying the application specific USB peripheral 30 as a printer class device although the application specific USB peripheral 30 does not constitute a printer, and by generating responses that alter the process of PnP enumeration to create partially instantiated printer driver stack 60 on host 20, in various implementations. Although the application specific USB peripheral 30 is not a printer, in this implementation, the USB printer class interface 37 is configured to identify the application specific USB peripheral 30 as a printer class device 13 (USB class code 0x07 hexadecimal) to the host during Plug and Play enumeration instead of identifying the application specific USB peripheral as a HID class device (USB class code 0x03 hexadecimal) or Application Specific class device or Vendor Specific class device (USB class codes 0xFE and 0xFF hexadecimal respectively). Identifying the application specific USB peripheral as printer class device 13 instead of a vendor specific class device or as an application specific class device may avoid the need for an application specific USB peripheral driver, in various implementations.

The USB printer class interface 37 is configured specifically to identify the application specific USB peripheral 30 as a printer class device 13 and to generate responses that alter the process of PnP enumeration, in various implementations. These responses that alter the process of PnP enumeration deviate from the responses of a standard printer class device. Among various other tasks, USB printer class interface 37 manages the communication of data through default pipe 71 (also known as the control pipe), bulk OUT pipe 73, or bulk IN pipe 75, in various implementations.

USB printer class interface 37, in the implementation of FIG. 2, responds to printer class specific requests transmitted from host 20 via default pipe 71 during PnP enumeration. The default pipe 71 is defined by USB endpoint 0 (EP0) and is used for low level USB operations such as setting the USB device address as well as USB class protocol operations such as GET_PORT_STATUS.

The USB printer class interface 37 may identify the application specific USB peripheral 30 as a printer class device 13 (USB class code 0x07 hexadecimal). The responses from USB printer class interface 37 to the printer class specific requests from USB printer class protocol driver 47 on host 20 during PnP enumeration alter the process of PnP enumeration and subsequent printer discovery in order to create partially instantiated printer driver stack 60 without instantiation of a printer object in the host OS 25. The USB printer class interface 37 may generate a response during PnP enumeration selected from NAK response (receiving device cannot accept data or transmitting device cannot send data), STALL response (endpoint is halted or control pipe request is not supported), or Null Data response (ACK acknowledge response with null data or zero length data) to alter the process of PnP enumeration (see Table 3).

USB device controller 43 of application specific USB peripheral 30, in the implementation of FIG. 2, connects operably to corresponding USB host controller 41 of host 20 via USB communication medium 40 to allow USB communication between application specific USB peripheral 30 and host 20. USB communication medium 40 may be configured as, for example, a cable or other mechanical connector, a radio frequency (RF) connection, an infrared (IR), laser, or other optical connection, or virtual machine connection, in various implementations.

USB device controller 43 and USB host controller 41 may include various mechanical couplings, electronics, hardware, firmware, and so forth to allow for the attachment of USB communication medium 40 to USB device controller 43 and to USB host controller 41, and to enable communication between USB device controller 43 and USB host controller 41 via USB communication medium 40 according to USB standards as specified by the USB-IF, as would be understood by one of ordinary skill in the art upon study of this disclosure. USB host controller 41 may be connected to a bus that forms a portion of host 20.

The application specific USB peripheral 30 including at least portions of application specific circuitry 31, application specific logic 33, device tunnel interface 35, USB printer class interface 37, and USB device controller 43 may be implemented using a microcontroller (MCU), micro processing unit (MPU), field programmable gate array (FPGA), application specific integrated circuit (ASIC), system on chip processor (SoC) or other programmable device that may implement a USB device controller 43 and USB printer class interface 37 along with interfaces to application specific circuitry 31 and application specific logic 33. The application specific USB peripheral 30 including application specific circuitry 31, application specific logic 33, device tunnel interface 35, USB printer class interface 37, and USB device controller 43 may include control logic that may be hardware based, firmware based, software based with the software operably received by application specific USB peripheral 30, or combinations thereof, in various implementations.

Host 20, as illustrated in FIG. 2, includes application specific controller 51, host tunnel interface 50, and partially instantiated printer driver stack 60. Partially instantiated printer driver stack 60, as illustrated, includes USB printer class protocol driver 47, USB bus driver 44, and USB host controller 41. Printer driver stack 60 is conceptual and is presented for explanatory purposes. Printer driver stack 60 may be representative of a generalized printer driver stack of a generic host OS with software operatively implementing the USB-IF printer class device (PCD) protocol specification at the top of the printer driver stack and software operatively driving USB hardware or moderating general USB tasks at lower levels of the printer driver stack. Top, as in for example the top 63 of the printer driver stack 60, includes the top and upper portions of the printer driver stack. The USB printer class protocol driver 47 handles USB data sent to the USB print class device using the OUT pipe 73, handles USB data received from the USB print class device using IN pipe 75, and handles the device class specific requests through the default pipe (aka control endpoint) using bi-directional IN and OUT USB data transfers via default pipe 71.

Discussing each of these in order, application specific controller 51 executes on host 20, as illustrated in FIG. 2, to form the application specific interface 84 with application specific logic 33 of application specific USB peripheral. Application specific controller 51 may cooperate with application specific circuitry 31 through application specific logic 33. Application specific controller 51 on host 20 and application specific logic 33 on application specific USB peripheral 30 may be complementary to one another and connected in a logical sense (whereas the physical connection is via USB communication medium 40), which is indicated by application specific interface 84 illustrated in FIG. 2. Application specific controller 51 and application specific logic 33 may be implemented to cooperate with one another to provide a complete integrated application specific solution. As illustrated in FIG. 2, application specific controller 51 communicates with application specific logic 33, at least in part, through printer class tunnel 80. A number of application specific controllers, such as application specific controller 51, may communicate with one another or with application specific logic 33, in various implementations. Note that more than one application specific controller, such as application specific controller 51, may cooperate communicate with host tunnel interface 50 and with application specific logic 33, in other implementations. [51] For example, application specific controller 51 may receive data from application specific logic 33 indicative of the status of application specific circuitry 31 as determined by application specific logic 33, which communicates with application specific circuitry 31. Application specific controller 51 may receive data from application specific logic 33 indicative, for example, of the operation of application specific circuitry 31 as controlled by application specific logic 33.

Data, as used in this disclosure, may, for example, include data, control signals, command(s), status, and other information in digital format. In various implementations, the data received by application specific controller 51 from application specific logic 33 may include physical data detected by the application specific circuitry 31 such as, for example, temperature, pressure, velocity, acceleration, location, light intensity, color, electrical resistivity, voltage, radiation intensity (e.g. alpha, beta, gamma) and communicated from the application specific circuitry 31 to application specific logic 33. In various implementations, the data received by application specific controller 51 from application specific logic 33 may include, for example, communications received by application specific circuitry 31 from RF or other communication mediums, or stored information obtained by the application specific circuitry 31 such as the contents of a magnetic strip on a credit card or digital storage device.

Application specific controller 51 may transmit data to application specific logic 33 to configure the operation of application specific logic 33, or to control the operation of application specific circuitry 31 as directed by application specific logic 33. In various implementations, the data transmitted by application specific controller 51 to application specific logic 33 may include, for example, control signals, commands, configuration settings, information to be sent via RF or other communication mediums, information to be stored, information to be encrypted, or information to be sent to other devices in communication with the application specific circuitry 31.

In various implementations, application specific controller 51 may include various virtual user interface(s) such as screens, buttons, slides, input fields, and so forth for the acceptance of user input to allow the user to transmit data to the application specific logic 33, for example, to control the operation of application specific USB peripheral 30 including application specific circuitry 31. In various implementations, application specific controller 51 may include user interfaces to impart data received from the application specific logic 33 to the user, for example, by visual display of the data. Application specific controller 51 may process data received from application specific logic 33, and may do so, for example, in conjunction with the impartation of the data received from application specific logic 33 to the user, or in conjunction with the control of application specific logic 33 by application specific controller 51.

Host tunnel interface 50 forms the interface between application specific controller 51 and partially instantiated printer driver stack 60 to communicate data between application specific controller 51 and partially instantiated printer driver stack 60. Host tunnel interface 50 provides the interface to printer class tunnel 80 within host 20, in this implementation. Host tunnel interface 50 establishes and maintains connections to USB printer class protocol driver 47 for each application specific USB peripheral, such as application specific USB peripheral 30, connected to the host 20. Host tunnel interface 50 may find the object associated with the partially instantiated printer driver stack, such as partially instantiated printer driver stack 60, of the instance of the printer class tunnel related with a specific application specific USB peripheral. Host tunnel interface 50 may encapsulate data or may de-encapsulate data to/from printer class tunnel 80. Host tunnel interface 50 may transmit data that may be encapsulated to the application specific USB device, or receive data, which is de-encapsulated, from the application specific USB device. Encapsulation may include encryption algorithms such as AES, Twofish, DES, or other encryption; or encoding such as XML, hexadecimal, ASCII, BASE64, octal or other encoding, in various implementations. Host tunnel interface 50 may be included in host OS 25 as a library function, may execute as an application in the background within host OS 25, or may form a portion of application specific controller 51 so that host tunnel interface 50 is initiated when application specific controller 51 is initiated, in various implementations.

Partially instantiated printer driver stack 60 includes USB printer class protocol driver 47, USB bus driver 44, and USB host controller 41, in the illustrative implementation of FIG. 2. In other implementations, the partially instantiated printer driver stack, such as partially instantiated printer driver stack 60, may have other configurations and may be divided in various ways into various device drivers. In various host implementations, the printer driver stack 60 may have fewer or more intermediate USB drivers comprising the driver stack.

As illustrated in FIG. 2, USB printer class protocol driver 47 provides the logic that implements the USB-IF printer class protocol specification on host 20. Among various tasks, USB printer class protocol driver 47 manages the transmission and receiving of data through default pipe 71 (aka control pipe), bulk OUT pipe 73, or bulk IN pipe 75, in various implementations. This includes sending data to the application specific USB peripheral 30 using the OUT pipe, receiving data from the application specific USB peripheral using the IN pipe, identifying the application specific USB peripheral 30 (e.g., make and model) using the GET_DEVICE_ID class specific request, retrieving printer port status of the application specific USB peripheral 30 using the GET_PORT_STATUS class specific request, and issuing SOFT_RESET command request to the application specific USB peripheral 30. USB printer class protocol driver 47 may be implemented in software operatively received by host 20 including host OS 25.

USB printer class protocol driver 47 on host 20 and USB printer class interface 37 on application specific USB peripheral 30 are complementary to one another and connected in a logical sense, as indicated graphically in FIG. 2 by USB print class interface 86 passing between USB printer class protocol driver 47 and USB printer class interface 37. USB printer class protocol driver 47 on host 20 and USB printer class interface 37 may cooperate with one another to create partially instantiated printer driver stack 60 during PnP enumeration. As illustrated, USB printer class protocol driver 47 forms the top 63 of partially instantiated printer driver stack 60 because there is no instantiation of a printer object at the top 63 of partially instantiated printer driver stack 60, which results in a "No Printer Attached" condition. The "No Printer Attached" condition results in a host state whereby additional printer driver stack layers such as print language monitors and print spoolers do not connect to the printer driver stack, in this implementation. In various implementations, the partially instantiated printer driver stack 60 may have differing levels of disconnect, which may include stack layers being instantiated such as print monitor with the objective of controlling the host such that the OS and user cannot directly use or otherwise print to the application specific USB peripheral 30 as represented in the partially instantiated printer driver stack 60.

USB bus driver 44, as illustrated, forms the interface between USB printer class protocol driver 47 and USB host controller 41. USB bus driver 44 may control the operation of USB host controller 41, and USB bus driver 44 may interface with USB host controller 41. USB bus driver 44 may be implemented in software operably received by host 20 including host OS 25, and USB bus driver 44 may communicate with USB host controller 41 to control the USB bus that forms a portion of host 20. USB bus driver 44 may establish default pipe 71, bulk OUT pipe 73, or bulk IN pipe 75 between host 20 and application specific USB peripheral 30 through USB host controller 41, in various implementations.

USB host controller 41, which forms the bottom 61 of partially instantiated printer driver stack 60 in this implementation, may include various mechanical couplings, electronics, hardware, firmware, and so forth to allow for the attachment of USB communication medium 40 to USB host controller 41 on host 20 and USB device controller 43 on application specific USB peripheral 30 to enable communication between USB host controller 41 and USB device controller 43 via USB communication medium 40, as would be recognized by those of ordinary skill in the art upon study of this disclosure.

As illustrated in FIG. 2, printer class tunnel 80 as implemented on host 20 includes host tunnel interface 50 and partially instantiated printer driver stack 60. Printer class tunnel 80 as implemented on application specific USB peripheral 30 includes device tunnel interface 35, USB printer class interface 37, and USB device controller 43, as illustrated. Printer class tunnel 80, in this implementation, further includes USB communication medium 40 for USB communication between USB host controller 41 on host 20 and USB device controller 43 on application specific USB peripheral 30.

In the implementation of printer class tunnel 80 illustrated in FIG. 2, application specific controller 51 communicates with printer class tunnel 80 through host tunnel interface 50, and application specific logic 33 communicates with printer class tunnel 80 through device tunnel interface 35. On host 20, host tunnel interface 50 communicates with USB printer class protocol driver 47 provided by the host OS (USB class code 0x07 hexadecimal). USB printer class protocol driver 47 communicates with USB bus driver 44, and USB bus driver 44 communicates with USB host controller 41, as illustrated. USB host controller 41 on host 20 communicates with USB device controller 43 on application specific USB peripheral 30 via USB communication medium 40. On application specific USB peripheral 30, USB device controller 43 communicates with USB printer class interface 37, and USB printer class interface 37 communicates with device tunnel interface 35. Thus, communication may flow from application specific controller 51 through printer class tunnel 80 to application specific logic 33 in the sequence: host tunnel interface 50, USB printer class protocol driver 47, USB bus driver 44, USB host controller 41, USB communication medium 40, USB device controller 43, USB printer class interface 37, and device tunnel interface 35. Communication may flow from application specific logic 33 through printer class tunnel 80 to application specific controller 51 in the sequence: device tunnel interface 35, USB printer class interface 37, USB device controller 43, USB communication medium 40, USB host controller 41, USB bus driver 44, USB printer class protocol driver 47, and host tunnel interface 50.

In this FIG. 2 implementation, application specific USB peripheral 30 identifies a printer class device to the host so that application specific USB peripheral 30 appears as a printer class device (PCD) to host 20, but application specific USB peripheral 30 is, in fact, an application specific peripheral and not a printer. USB printer class protocol driver 47 does not create a printer device because USB printer class interface 37 alters the process of PnP enumeration on host 20. USB printer class protocol driver 47 does not create a printer object and is thus disconnected from a printer, in this implementation, so that the USB printer class protocol driver 47 is not associated with an instantiation of a printer object on host 20.

Host tunnel interface 50 detects the "No Printer Attached" condition indicative of partially instantiated printer driver stack 60, and host tunnel interface 50 intercepts and connects to the USB printer class protocol driver 47 at the top 63 of partially instantiated printer driver stack 60. When connected to USB printer class protocol driver 47 of partially instantiated printer driver stack 60, host tunnel interface 50 provides the interface for data transfer between application specific controller 51 and USB printer class protocol driver 47 of partially instantiated printer driver stack 60. In various implementations, host tunnel interface 50:

1) Discovers the interface object to the partially instantiated printer driver stack 60;
2) Identifies the application specific USB peripheral 30 to be controlled;
3) Provides USB Print Class tunnel communications channel to partially instantiated printer driver stack 60 supporting write/send and read/receive functions between the host OS 25 and the Application Specific USB device 30;
4) Provides encapsulation of data to be sent to application specific USB peripheral 30;
5) Provides de-encapsulation of data received from application specific USB peripheral 30.

There are several ways to implement the host tunnel interface 50. Some of these differences may result from the supported capabilities and subsystems available in different host operating systems. Common implementations of the host tunnel interface, may include, for example: dynamical link library (DLL), static library, shared library, system service, daemon, 'C' code library, 'C++' object, remote procedure call (RPC), loadable module, functional driver, and in-line code.

The operations of host tunnel interface 50 on host 20 and device tunnel interface 35 on application specific USB peripheral 30 are further described in Table 1.

TABLE 1

| Operation | Host Tunnel Interface 50 | Device Tunnel Interface 35 |
|---|---|---|
| Discover | Find interface object into partially instantiated Host OS device driver stack. (Implementation is unique and specific to Host OS) | Produce conditions to create partially instantiated printer device driver stack on Host OS. (Using the USB ACK w/ NULL data, NAK or STALL response) |
| Identify | Using the interface object(s) discovered above, identify the application specific USB peripheral to be controlled and track the application specific USB peripheral for later printer class tunnel communications. (The identification step(s) may also include authentication et al. operations) | Provide unique identification to Host OS. (Along with any additional functionality such as authentication or authorization.) |
| Communicate | Encapsulate data/information (communications) between Host OS and Application Specific USB Device using USB Print Class defined interface. (May include additional encoding, encryption, etc. Includes both data directions: encapsulation and decoding/de-capsulation.) | Encapsulate data/information (communications) between Application Specific USB Device and Host OS using USB Print Class defined interface. (May include additional encoding, encryption, etc. Includes both data directions: encapsulation and decoding/de-capsulation.) |

Application specific USB peripheral 30, host 20, or both application specific USB peripheral 30 and host 20 may be virtual, virtualized, or para-virtualized, in various implementations. In various implementations, USB host controller 41, USB device controller 43, or USB communication medium 40 may be virtualized or para-virtualized, at least in part, for example, when using a virtual machine, virtual host or virtual operating system such as VMware, Virtual PC, Virtual Box, or hypervisors such as Xen.

In other implementations of USB tunnel that include a printer class tunnel, logic within the USB printer class interface may create a pseudo printer on the host. In such implementations, the USB printer class interface creates a more fully instantiated printer driver stack attached to a pseudo printer having a name, but not having a printer device driver. A printer driver and associated software components such as the print spooler would not be attached to the more fully instantiated printer driver stack, thereby allowing a printer class tunnel to be created. Future host operating systems or virtual machine host operating system may include provisions to support this type of pseudo print device.

Host OS 25 is operably received by host 20, as illustrated. Host OS 25 may be, for example, Microsoft Windows, Linux, UNIX, MAC OS X, VxWorks, INTEGRITY, Android, iOS, or a monolithic software or firmware implementation without a defined traditional operating system. Host OS 25 is illustrated in FIG. 2 as surrounding host tunnel interface 50, USB printer class protocol driver 47, USB bus driver 44, and USB host controller 41 to illustrate the interrelatedness between the host OS 25 and host tunnel interface 50, USB printer class protocol driver 47, USB bus driver 44, and USB host controller 41.

Host OS 25 is operative with host 20 to support host tunnel interface 50, and partially instantiated printer driver stack 60 including USB printer class protocol driver 47, USB bus driver 44, and USB host controller 41, at least portions of which may be included in the host OS 25.

Portions of, for example, USB printer class protocol driver 47, USB bus driver 44, or USB host controller 41 may be implemented in host 20 as, for example, firmware, hardware, logic circuits, and combinations thereof, in various implementations.

Host 20 and application specific USB peripheral 30 communicate with one another via USB communication medium 40 through default pipe 71, bulk OUT pipe 73, or bulk IN pipe 75, as illustrated in FIG. 2. Note that default pipe 71, bulk OUT pipe 73, and bulk IN pipe 75 are illustrated as logically separate from USB communication medium 40 in FIG. 2 for explanatory purposes, but, in fact, default pipe 71, bulk OUT pipe 73, and bulk IN pipe 75 data are transferred over USB communication medium 40. Similarly, printer class tunnel 80, application specific interface 84, and USB print class interface 86 are illustrated as passing directly between host tunnel interface 50 and device tunnel interface 35, directly between application specific controller 51 and application specific logic 33, and directly between USB printer class protocol driver 47 and USB printer class interface 37, respectively, for explanatory purposes, but, in fact data is transferred through the partially instantiated printer driver stack 60, through USB communication medium 40, and through the USB data path of applications specific USB peripheral 30 including through USB device controller 43, USB printer class interface 37, and device tunnel interface 35.

USB communication between host 20 and application specific USB peripheral 30 is based on pipes, such as default pipe 71 (also known as the control pipe), bulk OUT pipe 73, or bulk IN pipe 75, which are logical communication channels connecting host 20 and application specific USB peripheral 30. Pipes are logical constructs that correspond one-to-one with USB endpoints, which are defined in the application specific USB peripheral 30. Because of the one-to-one correspondence between pipes and USB endpoints, the terms pipe and USB endpoint may be used interchangeably. A pipe is considered ephemeral and can come and go during operation of the application specific USB peripheral 30, whereas an USB endpoint is defined and numbered during the initialization phase of PnP enumeration (i.e., after application specific USB peripheral 30 is connected to host 20 via USB communication medium 40, or host 20 is powered on with application specific USB peripheral 30 already connected to host 20 via USB communication medium 40). A USB endpoint is considered more permanent in terms of the PnP enumeration life span, but disappears when application specific USB peripheral 30 is disconnected from host 20 or host 20 is powered down. The USB endpoint definition resides in application specific USB peripheral 30 as an endpoint descriptor and dictates the type of USB endpoint (bulk, interrupt, isochronous, control), direction of data travel (from the host as OUT, or to the host as IN), the USB endpoint number established during PnP enumeration, polling interval for interrupt transfers, and the number of bytes per packet of USB data sent to/from the host 20.

Default pipe 71, bulk OUT pipe 73, or bulk IN pipe 75 are defined by USB-IF Printer class protocol specification for a printer class device 13 such as application specific USB peripheral 30. Default pipe 71 and bulk OUT pipe 73 are mandatory according to the USB-IF Printer class protocol specification. Bulk IN pipe 75 is optional according to the USB-IF Printer class protocol specification. The USB-IF Printer class protocol specification defines the USB interface and USB endpoints required for operation which forms the basis of the USB interface used by the application specific USB peripheral device (i.e., various implementations of the methods and apparatus disclosed herein).

A pipe, such as pipe 71, 73, 75, is defined by an endpoint descriptor that consists of a numeric address (0 to 15). The pipe is further associated with a data direction (IN or OUT relative to the host 20), transfer type (control, isochronous, bulk, or interrupt), and the maximum packet size supported by the USB endpoint. Application specific USB peripheral 30 includes a default pipe, such as default pipe 71 with USB endpoint 0 (EP0), also known as the control endpoint. Data transfers occur in both the IN direction (from application specific USB peripheral 30 to host 20) and the OUT direction (from host 20 to application specific USB peripheral 30) via default pipe 71 at EP0. Default pipe 71 may be used for a wide variety of setup and control purposes including the automatic configuration of PnP. Data including commands to application specific USB peripheral 30 and responses from application specific USB peripheral 30 may be transferred between host 20 and application specific USB peripheral 30 via default pipe 71. Furthermore, USB device class specific requests such as PCD specific requests are handled with default pipe 71.

Bulk OUT pipe 73 communicates data from host 20 to application specific USB peripheral 30 with USB endpoint which may be, for example, commands, control, instructions, data or information to be sent to the application specific USB device. In various other implementations, the data communicated via pipe 73 may include, for example, Page Description Language (PDL) data or Printer Control Protocol (PCP) data.

Bulk IN pipe 75 communicates data from application specific USB peripheral 30 to host 20 with USB IN endpoint. In various implementations, the data communicated via pipe 75 may include, for example, PDL or PCP response data. The optional bulk IN pipe 75 may be included, in various implementations, to support bi-directional (two way) data communication between host 20 and application specific USB peripheral 30, in contrast to implementations having only bulk OUT pipe 73 (mandatory according to the USB printer class definition), which may have unidirectional (one-way) data communications.

There is no restriction, in various implementations, on the semantics, type or size of data that may be communicated between host 20 and the application specific USB peripheral 30 by being transferred across the bulk IN pipe 73 and the bulk OUT pipe 75. In various implementations, data is transmitted between application specific USB peripheral 30 and host 20 through default pipe 71, bulk OUT pipe 73, or bulk IN pipe 75 by encoding the data within a pre-defined PDL or a PCP such as, for example, Post Script and Printer Command Language, respectively. It should be noted that PDL and/or PCP may be defined by a printer vendor (i.e., custom PDL or PCP) and need not be a standard such as Post Script or Printer Command Language. In some implementations, a custom PDL or PCP may be used for transmitting data between host 20 and application specific USB peripheral 30. In such implementations, coding software operative on host 20 may be required to encode the custom PDL or PCP and matching coding firmware/software operative on application specific logic 33 of the application specific USB peripheral 30 may be required to decode the custom PDL or PCP.

In other implementations, instead of transferring data as either PDL or PCP as defined in the USB-IF printer class protocol specification document "Universal Serial Bus Device Class Definition for Printing Devices" data may be transferred between application specific USB peripheral 30 and host 20 through default pipe 71, bulk OUT pipe 73, or bulk IN pipe 75 by encoding the data in formats customized for the application specific controller 51 and the application specific logic 33. Data may be transferred between application specific USB peripheral 30 and host 20 through default pipe 71, bulk OUT pipe 73, or bulk IN pipe 75 by encoding the data in formats customized for the host tunnel interface 50 and the device tunnel interface 35.

In various implementations, data may be transferred between host 20 and application specific USB peripheral 30 using a cryptographic cipher. For example, software operative on host 20 may apply a cipher to the data to ensure that data transferred to application specific USB peripheral 30, for example via bulk OUT pipe 73, is secure and cannot be intercepted or viewed by third parties without the cipher key. Similarly, the application specific USB peripheral 30 may encrypt data sent via bulk IN pipe 75 to the host 20. Some examples of applicable encryption/cipher algorithms include:

Exemplary symmetric key encryption (aka private key encryption)
AES, Twofish, Blowfish, RC4, 3DES, TEA, XTEA
Exemplary asymmetric key encryption (aka public key encryption)
PGP, GPG, RSA, PKCS#1, DSA, ECC, ElGamal It should be noted that bi-directional data transfer using both bulk OUT pipe 73 and bulk IN pipe 75 may be used in implementing asymmetric key cryptography. Key management for symmetric key encryption may be implemented in various ways such as, for example, pre-shared keys, key exchange, Diffie-Hellman key exchange, and keys derived from mathematical functions based on unique application specific USB peripheral data such as the application specific USB peripheral serial number (e.g., one-way secure cryptographic hash algorithm derived from the Application specific USB peripheral serial number may be used as the basis for a unique cipher key.)

In various implementations, data may be transferred between host 20 and application specific USB peripheral 30 using an encoding algorithm. For example, software operative on host 20 may encode data to represent information in a way that may be easier for application specific logic 33 to interpret and process, or to make the data easier to read by a human, compress the data for faster transmission, or for various other reasons when data is sent to the application specific USB peripheral via bulk OUT pipe 73. Similarly, the USB peripheral may encode data sent via bulk IN pipe 75 to the host 20. Some examples of applicable encoding algorithms may include:

---

ASCII, UNICODE, UTF-8, UTF-16, UTF-32, EBCDIC, hexadecimal, octal, BASE64, XML, HTML, Lempel-Ziv, LZW, ZIP, IDRC, Huffman. H.264, MP3

---

If data in excess of the USB pipe packet size is to be transferred from host 20 to application specific USB peripheral 30 via the bulk OUT pipe 73 (see wMaxPacketSize in Table 2), then the host OS 25 USB printer class protocol driver 47 alters the data into multiple packets of size wMaxPacketSize or less until all data is transferred to application specific USB peripheral 30. Conversely, if data in excess of the USB pipe packet size is to be transferred from the application specific USB peripheral 30 to host 20 via the IN pipe 75, then the application specific USB peripheral 30 USB printer class interface 37 alters the data into multiple packets of wMaxPacketSize or less until all data is transferred to host 20.

Figure 3:
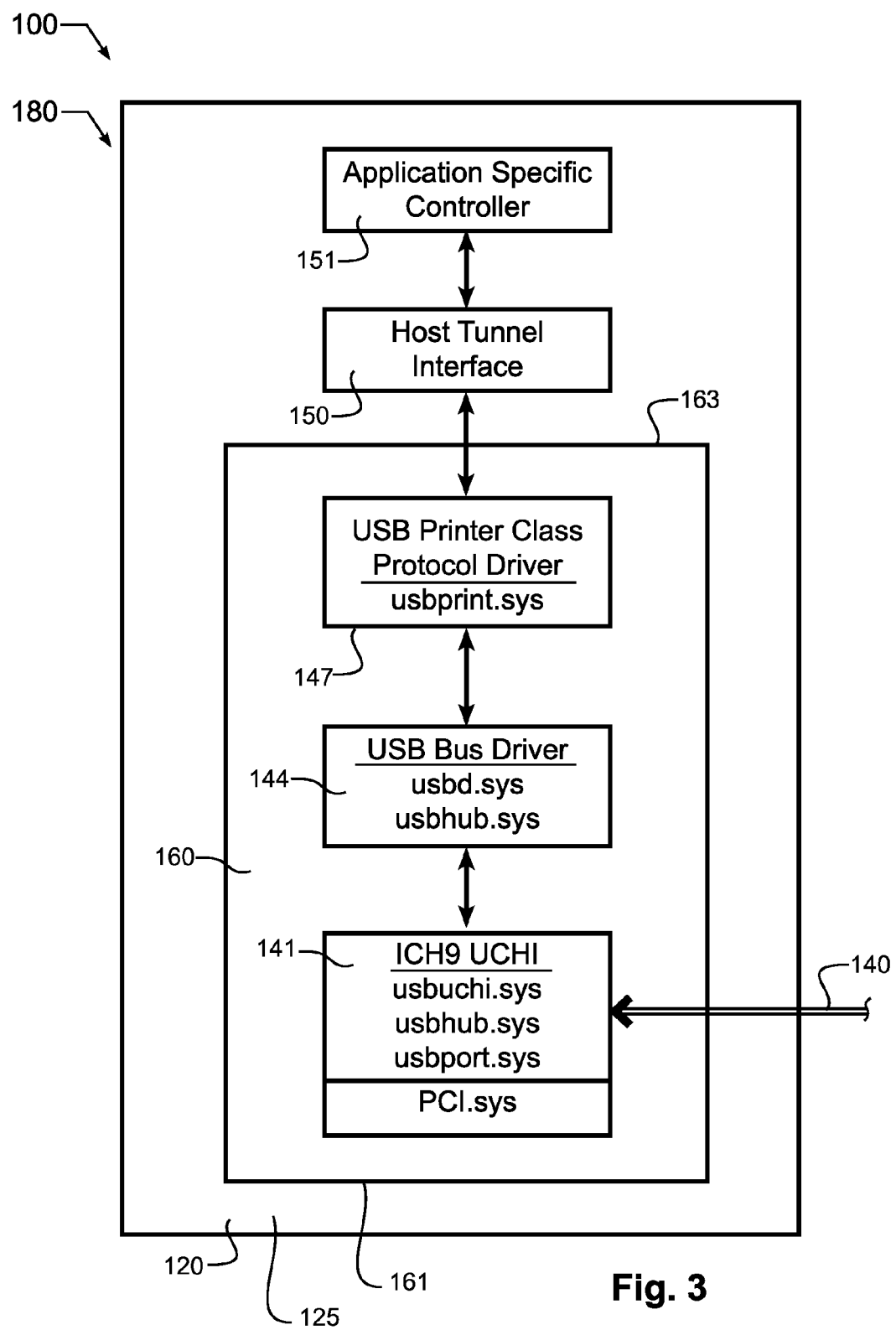
FIG. 3 illustrates by schematic diagram portions of another exemplary implementation of a USB tunnel apparatus.

FIG. 3 illustrates portions of USB tunnel 100 including portions of printer class tunnel 180 implemented on host 120 executing host OS 125. Host OS 125 is Windows 7 OS in this example. The portions of printer class tunnel 180 as implemented on host 120 executing Windows 7 OS include host tunnel interface 150, partially instantiated printer driver stack 160, and USB communication medium 140, as illustrated. Partially instantiated printer driver stack 160 includes USB host controller 141, USB bus driver 144, and USB printer class protocol driver 147 operatively received upon host 120, in this implementation.

USB host controller 141, in the exemplary host implementation of FIG. 3, is partly implemented in software designated as usbhci.sys, usbhub.sys, usbports.sys, and pci.sys operatively received on host 120. USB host controller 141 is a device driver for the Universal Host Controller Interface (UHCI) device residing on the Peripheral Component Interconnect (PCI) bus (not shown), which is a bus for attaching peripheral hardware devices such as USB host controller 141 to host 120. USB host controller 141 is associated with the Physical Device Object (PDO) in each child of the PCI Bus node. USB host controller 141 is designated as the bottom 161 of partially instantiated printer driver stack 160 in this implementation. USB controller 141, in this example, may monitor the insertion or removal of a USB device on USB ports on host 120, power-manage individual devices on USB ports, control power to USB ports, direct the USB bus (individual USB devices cannot arbitrate for the bus), poll USB devices by using a polling interval that is determined by the USB device (the USB device is assumed to have sufficient buffering to account for the time between the polls).

USB bus driver 144, in the exemplary host implementation in FIG. 3, is partly implemented in software device drivers designated at usbd.sys and usbhub.sys operatively received on host 120.

USB printer class protocol driver 147 provides the logic that implements the USB-IF printer class protocol specification on host 120. USB printer class protocol driver 147 is implemented in software designated as usbprint.sys, as illustrated in FIG. 3.

Host tunnel interface 150, which is included in host OS 125, operatively communicates with partially instantiated printer driver stack 160 and host tunnel interface 150 operatively communicates with application specific controller 151, as illustrated. In this implementation of USB tunnel 100, host tunnel interface 150 intercepts and connects to the USB printer class protocol driver 147, which forms the top 163 of partially instantiated printer driver stack 160. There is no instantiation of a printer object at top 163 of partially instantiated printer driver stack 160, which results in a "No Printer Attached" condition. Upon detecting the "No Printer Attached" condition indicative of partially instantiated printer driver stack 160, host tunnel interface 150 connects application specific controller 151 to the USB printer class protocol driver 147 that forms the top 163 of partially instantiated printer driver stack 160. Host tunnel interface 150 provides the interface between application specific controller 151 and USB printer class protocol driver 147, and, hence, host tunnel interface 150 forms the interface between application specific controller 151 and printer class tunnel 180, in this implementation.

Because host OS 125 does not create or establish a printer object, various software, such as language monitors, print spooler, and printer driver, are not operatively present in printer class tunnel 180, so that the printer class tunnel may have a hierarchy equivalently efficient in terms of total partially instantiated printer driver stack depth and USB interface speed in comparison with an application specific USB peripheral driver provided under Application or Vendor Specific class (USB class codes 0xFE and 0xFF hexadecimal). The partially instantiated printer driver stack 160 of printer class tunnel 180 results in a driver stack that operates with throughput speeds similar to application specific USB peripheral driver implementations, which may be several orders of magnitude faster than USB HID class implementations. The printer class tunnel 180 including partially instantiated printer driver stack 160 will transfer data at a higher rate than the USB HID class (USB class code 0x03) since the printer class tunnel 180 is not limited in performance by the constraints of the USB HID class definition. Therefore, the USB printer class tunnel 180 may perform on par with Application or Vendor specific class driver implementations.

Figure 4:
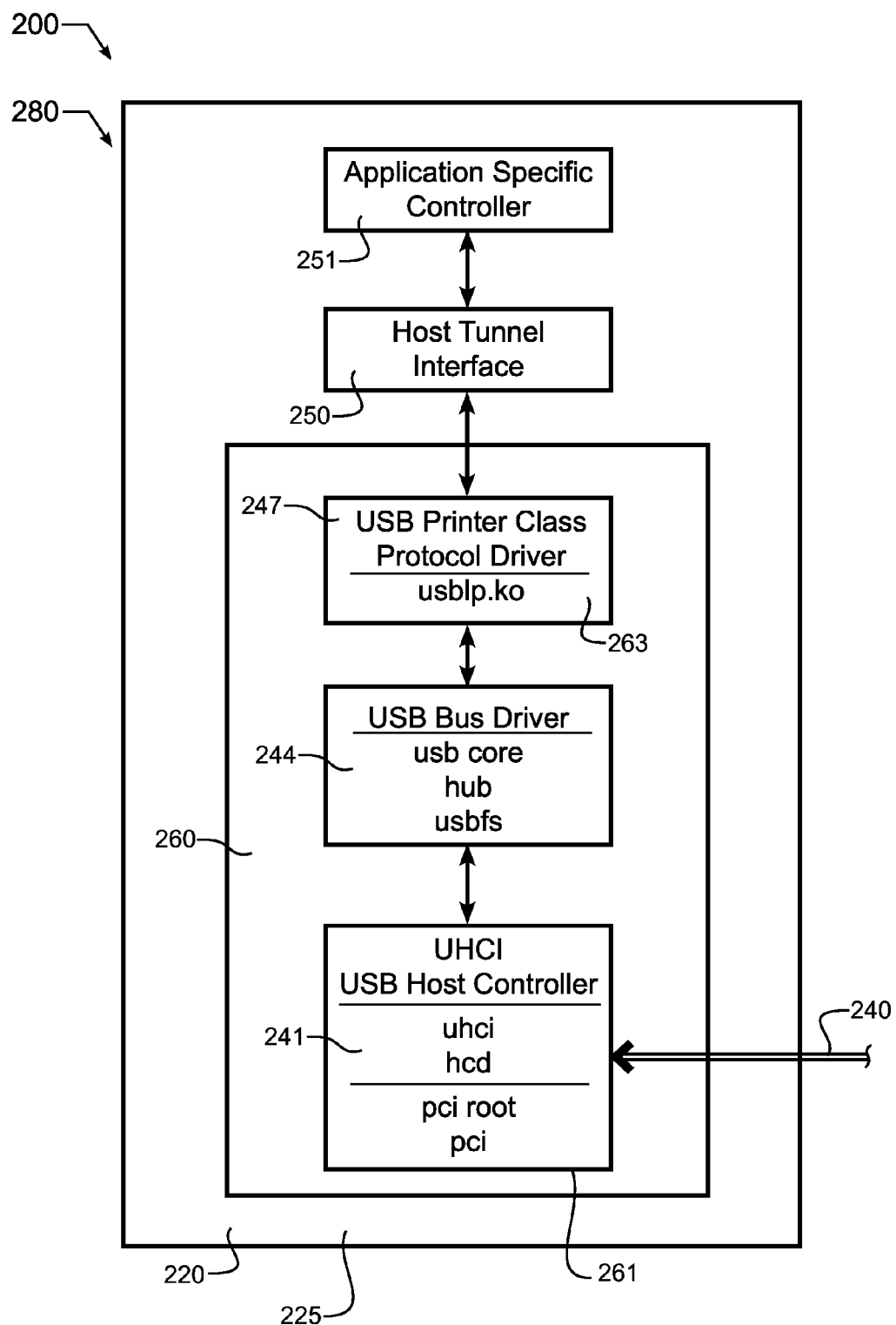
FIG. 4 illustrates by schematic diagram portions of yet another exemplary implementation of a USB tunnel apparatus.

FIG. 4 illustrates portions of USB tunnel 200 including portions of printer class tunnel 280 implemented on host 220 executing host OS 125. Host OS 125 is Linux in this example. The portions of printer class tunnel 280 illustrated in FIG. 4 include host tunnel interface 250, partially instantiated printer driver stack 260, and USB communication medium 240, as illustrated. Linux has a different device driver design and connection topology when compared with Microsoft Windows 7 (see FIG. 3). Unlike Windows 7, device drivers under Linux can be included directly into the OS kernel image itself Therefore, there may not be a clear device driver stack of loaded device driver modules in the USB in partially instantiated printer driver stack 260 like there is for the Windows OS 7.

FIG. 4 illustrates an exemplary hierarchy of partially instantiated printer driver stack 260 including USB printer class protocol driver 247, USB bus driver 244, and USB host controller 241. Partially instantiated printer driver stack 260 forms a portion of USB tunnel 200 including portions of printer class tunnel 280, as illustrated. As illustrated in FIG. 4, USB printer class protocol driver 247 is implemented in software usblp.ko, which is operable on host 220. USB printer class protocol driver 247 forms top 263 of partially instantiated printer driver stack 260.

USB bus driver 244, in this implementation, is implemented in software operable on host 220: usbcore, hub, and usbfs. USB bus driver 244 may be conceived of, at least for explanatory purposes, as forming an intermediate level of partially instantiated printer driver stack 260 as indicated in FIG. 4.

USB host controller 241 is implemented in software operable on host 220: uhci, hcd, pci root and pci. USB host controller 241 may be conceived of as forming a bottom 261 of partially instantiated printer driver stack 260, as illustrated in FIG. 4.

There is no instantiation of a printer object at top 263 of partially instantiated printer driver stack 260, which results in a "No Printer Attached" condition in host OS 225. Upon detecting the "No Printer Attached" condition in host 225 indicative of partially instantiated printer driver stack 260, host tunnel interface 250 connects application specific controller 251 to the USB printer class protocol driver 247 that forms the top 263 of partially instantiated printer driver stack 260. Host tunnel interface 250 provides the interface between application specific controller 251 and USB printer class protocol driver 247, and, hence, host tunnel interface 250 forms the interface between application specific controller 251 and printer class tunnel 280, in this implementation.

Figure 5:
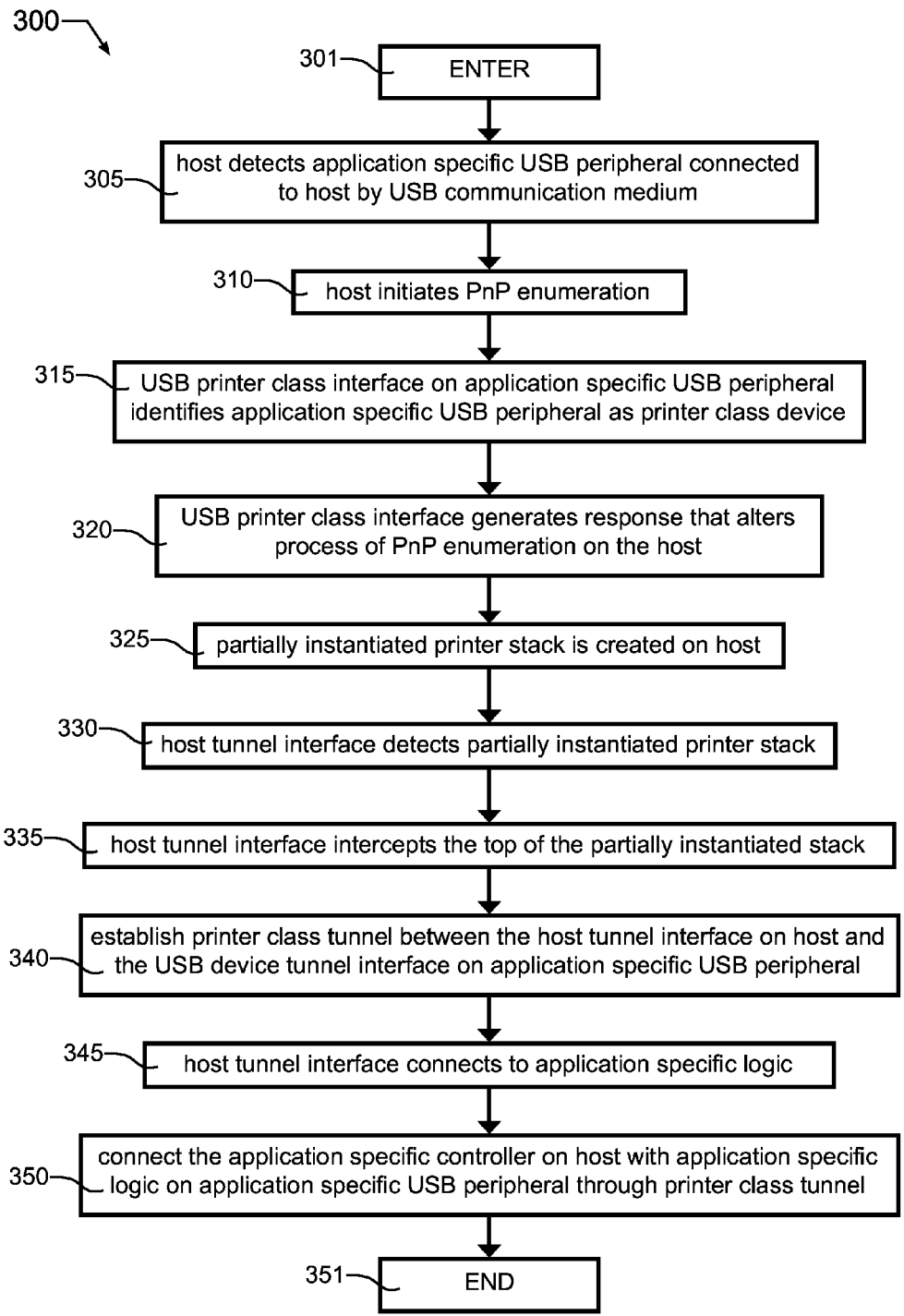
FIG. 5 illustrates by process flow chart an exemplary method of creating an exemplary USB tunnel apparatus.

FIG. 5 illustrates method 300 for establishing a USB tunnel, such as USB tunnel 10, 100, 200 including printer class tunnel 80, 180, 280. Method 300 is entered at step 301. At step 305, host, such as host 20, 120, 220 detects that application specific USB peripheral, such as application specific peripheral 30, is connected to host by USB communication medium, such as USB communication medium 40, 140, 240.

The host initiates PnP enumeration at step 310. The initiation of PnP enumeration at step 310 is prompted by detecting the application specific USB peripheral at step 305.

At step 315, the USB printer class interface, such as USB printer class interface 37, of application specific USB peripheral communicates a response to host initiated PnP enumeration that identifies application specific USB peripheral as a printer class device. The response may be communicated to USB printer class protocol driver, such as USB printer class protocol driver 47, 147, 247, on the host.

At step 320, the USB printer class interface generates a response to PnP enumeration that alters the process of PnP enumeration on the host. The response causes the USB printer class protocol driver, such as USB printer class protocol driver 47, 147, 247, to not attach to a printer object. Because there is no printer object attached to the USB printer class protocol driver, a partially instantiated printer driver stack, such as partially instantiated printer driver stack 60, 160, 260, is created at step 325.

At step 330, host tunnel interface, such as host tunnel interface 50, 150, 250, detects the partially instantiated printer driver stack.

At step 335, the host tunnel interface intercepts and connects to the top, such as top 63, 163, 263, of the partially instantiated printer driver stack. The USB printer class protocol driver forms the top of the partially instantiated printer driver stack. The host tunnel interface communicates with the USB printer class protocol driver, and, thus, the host tunnel interface forms the interface with the printer class tunnel.

At step 340, the printer class tunnel is established between the host tunnel interface on the host and the device tunnel interface, such as device tunnel interface 35, on the application specific USB peripheral. At step 340, the host USB printer class driver establishes a bulk OUT pipe, such as bulk OUT pipe 73, through the partially instantiated printer driver stack to the USB printer class interface 37 on the application specific USB peripheral. Optionally, the host USB printer class driver may establish a bulk IN pipe, such as bulk IN pipe 75, from the application specific USB peripheral through the partially instantiated printer driver stack, at step 340. The printer class tunnel on the host, in this implementation, includes the host tunnel interface, and the partially instantiated printer driver stack on the host. The printer class tunnel in this implementation includes the USB communication medium between the host and the application specific USB peripheral. The printer class tunnel on the application specific USB peripheral, in this implementation, includes USB device controller, such as USB device controller 43, USB printer class interface, and device tunnel interface. The host tunnel interface forms the interface to the printer class tunnel on the host, and the device tunnel interface forms the interface with the printer class tunnel on the application specific USB peripheral, in various implementations. A default pipe, such as default pipe 71, bulk IN pipe, or bulk OUT pipe is established and used by the USB printer class driver.

At step 345, the host tunnel interface connects with the application specific controller, such as application specific controller 51, 151, 251.

At step 350 connect the application specific controller on host with application specific logic on application specific USB peripheral through printer class tunnel. The application specific controller and the application specific logic are in operable communication with one another. With the host tunnel interface connected to the application specific controller and with the USB printer class protocol driver, data may be communicated between the application specific controller on the host and the application specific logic, such as application specific logic 33, on the application specific USB peripheral. Data may be communicated between the application specific controller and the application specific logic using various combinations of the default pipe (aka control endpoint), bulk IN pipe, and bulk OUT pipe. Method 300 terminates at step 351, as illustrated in FIG. 5.

Figure 6A:
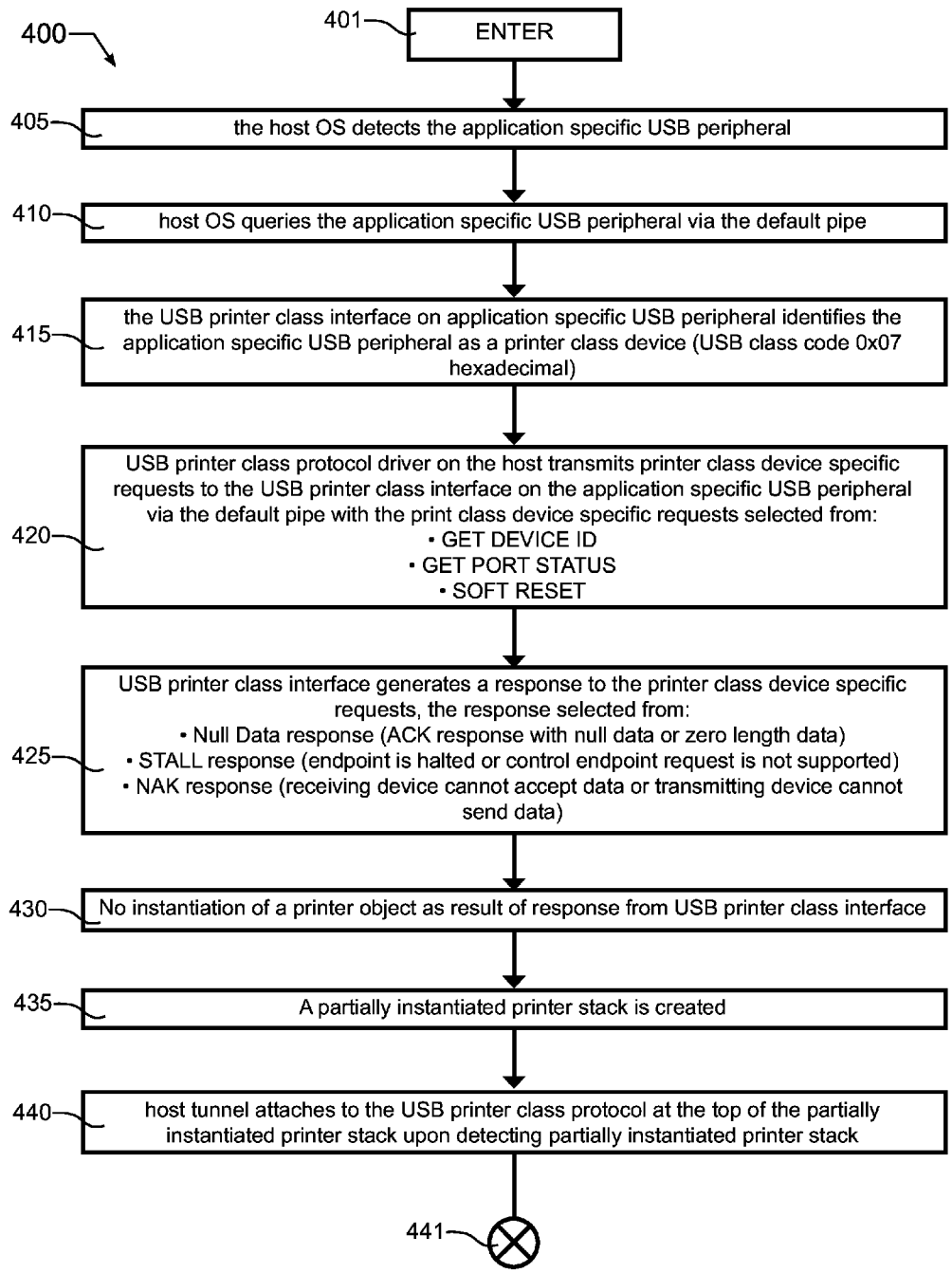
FIG. 6A illustrates by process flow chart another exemplary method of creating an exemplary USB tunnel apparatus.
Figure 6B:
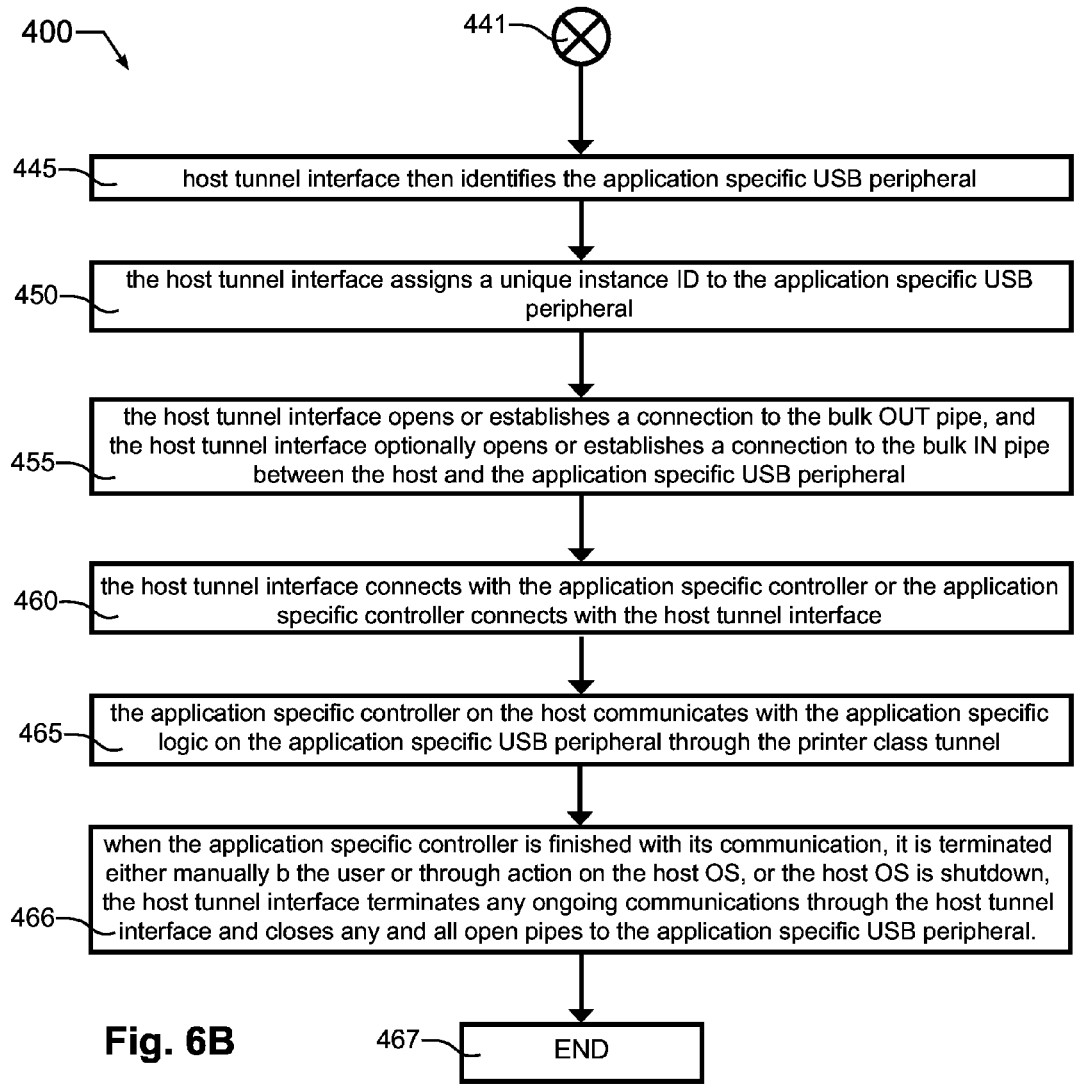
FIG. 6B is a continuation of the process flow chart of the exemplary method of FIG. 6A.

FIGS. 6A and 6B illustrates method 400 that includes various steps involved in establishing a USB tunnel including a printer class tunnel. Method 400 is entered at step 401 with the host being connected to the application specific USB peripheral via USB communication medium, as illustrated in FIG. 6A. At step 405, the host OS, such as host OS 25, 125, 225 detects the application specific USB peripheral.

At step 410, the host OS queries the application specific USB peripheral via the default pipe (aka control endpoint). The default pipe is implemented in part through the USB communication medium, USB bus driver, USB printer driver, application specific USB device. At step 415, the USB printer class interface on application specific USB peripheral identifies the application specific USB peripheral as a printer class device (USB class code 0x07 hexadecimal), such as USB printer class device 13, to the host in response to the query from the host at step 410.

At step 420, the USB printer class protocol driver on the host transmits printer class device specific requests to the USB printer class interface on the application specific USB peripheral via the default pipe because the application specific USB peripheral is identified as a USB printer class device per steps 410, 415. The printer class device specific requests transmitted by the USB printer class protocol driver to the USB printer class interface at step 420, for example, may include:

| |
|---|
| GET_DEVICE_ID |
| GET_PORT_STATUS |
| SOFT_RESET |

Other exemplary USB requests transmitted by the host USB driver stack to the USB printer class interface on application specific USB peripheral at step 420 may include standard device, standard interface, and standard endpoint requests:

| |
|---|
| CLEAR_FEATURE, GET_CONFIGURATION, GET_DESCRIPTOR, GET_INTERFACE, GET_STATUS, SET_ADDRESS, SET_CONFIGURATION, SET_INTERFACE, SET_FEATURE, and SET_DESCRIPTOR (optional). |

At step 425, the USB printer class interface on the application specific USB peripheral generates a response to the printer class device specific requests transmitted by the USB printer class protocol driver at step 420. When received by the USB printer class protocol driver, the response generated at step 425 by the USB printer class interface alters the process of PnP enumeration and subsequent printer discovery by the USB printer class protocol driver on the host. The responses (see Table 3) generated by the USB printer class interface on the application specific USB peripheral at step 425 may be selected from:

1. Null Data (ACK response with null data or zero length data)
2. STALL response (endpoint is halted or control endpoint request is not supported)
3. NAK response (receiving device cannot accept data or transmitting device cannot send data)

when the USB printer class interface receives USB print class specific requests: GET_DEVICE_ID, GET_PORT_STATUS, and SOFT_RESET.

Figure 9:
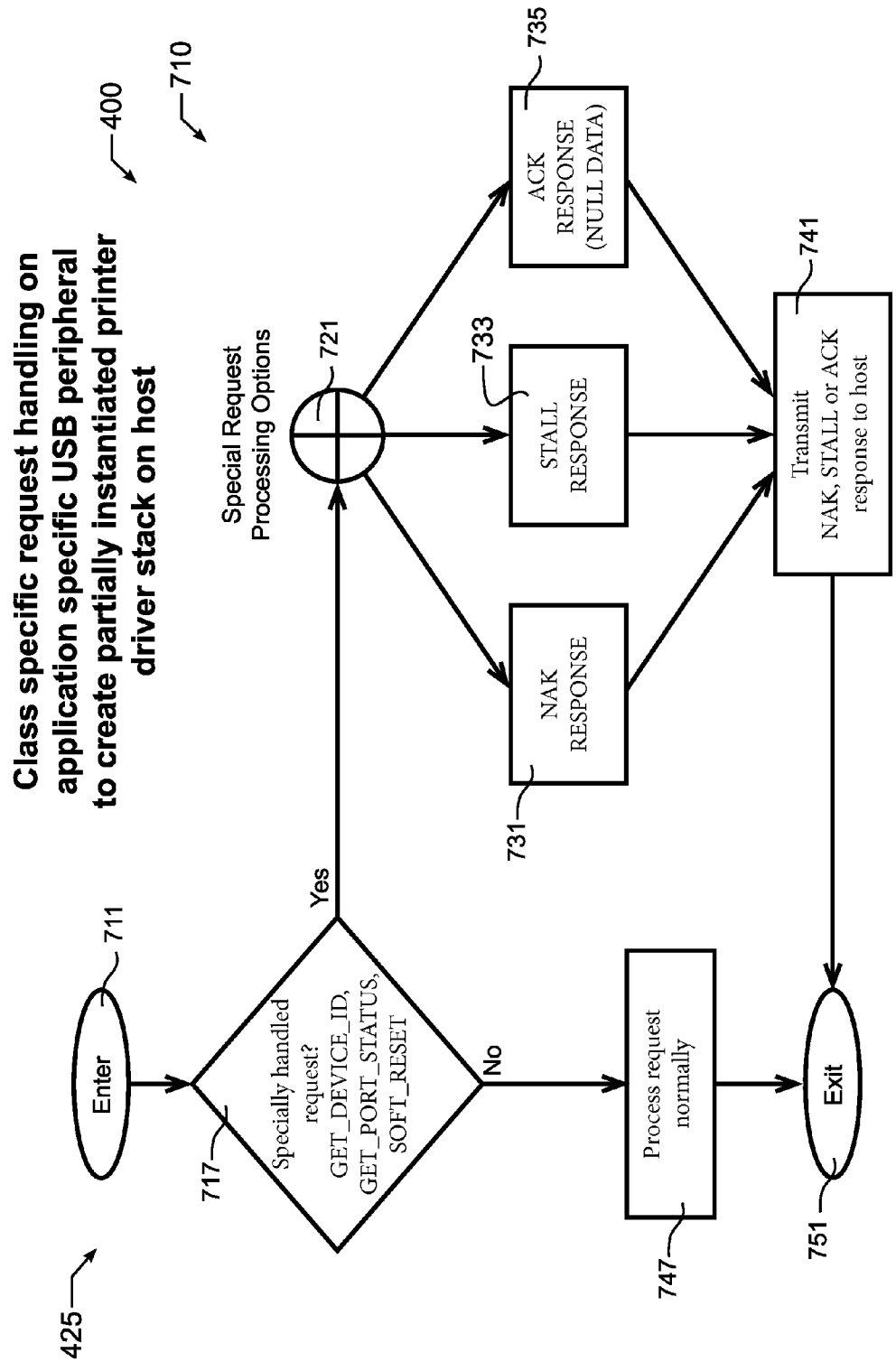

FIG. 9 illustrates method 710, which is an implementation of step 425 of method 400. Method 710 is entered at step 711. At step 717, the USB printer class interface on the application specific USB peripheral checks the standard requests and the printer class device specific requests transmitted at step 420 of method 400 to the USB printer class interface via the default endpoint (aka control endpoint) by the USB printer class protocol driver and the USB bus driver on the host. At step 717, if the printer class device specific requests are the specially handled requests (GET_DEVICE_ID, GET_PORT_STATUS, SOFT_RESET), method 710 branches from step 717 to step 721. At step 721, method 710 branches to a step selected from steps 731, 733, 735 to generate a response to the printer class device specific requests selected from NAK, STALL, or ACK with null or zero length data, respectively. Method 710 then proceeds to step 741 from step 731, step 733, or step 735. At step 741, the USB printer class interface on the application specific USB peripheral transmits the NAK response, STALL response, or ACK with null or zero length data response to the USB printer class protocol driver on the host. Method 710 proceeds from step 741 to step 751, and method 710 terminates at step 751.

Method 710 branches from step 717 to step 747 if the printer class device specific requests are not the specially handled requests (GET_DEVICE_ID, GET_PORT_STATUS, SOFT_RESET) as determined at step 717, and the printer class device specific requests are processed normally at step 747 without special modification and as specified in the documents "Universal Serial Bus Specification" USB_2.0.PDF and "Universal Serial Bus Device Class Definition for Printing Devices" USBPRINT11.PDF from USB-IF. Method 710 terminates at step 751.

Method 710 illustrated in FIG. 9 is implemented by the USB printer class interface on the application specific USB peripheral, in various aspects. The USB printer class interface on the application specific USB peripheral is configured to generate the response selected from NAK, STALL, or ACK with null or zero length data in response to the GET_DEVICE_ID, GET_PORT_STATUS, SOFT_RESET printer class device specific requests from the USB printer class protocol driver on the host, in various implementations. Methods disclosed herein may include the step of providing a USB printer class interface on the application specific USB peripheral that is configured to generate the response selected from NAK, STALL, or ACK with null or zero length data in response to the GET_DEVICE_ID, GET_PORT_STATUS, SOFT_RESET printer class device specific requests from the USB printer class protocol driver on the host. Apparatus disclosed herein may include a USB printer class interface on the application specific USB peripheral that is configured to generate the response selected from NAK, STALL, or ACK with null or zero length data in response to the GET_DEVICE_ID, GET_PORT_STATUS, SOFT_RESET printer class device specific requests from the USB printer class protocol driver on the host. Note that the NAK, STALL, or ACK with null or zero length data responses are exemplary. In other implementations, the USB printer class interface on the application specific USB peripheral may generate other responses that alter the chain of PnP enumeration in order to create a partially instantiated printer driver stack. Note that the NAK, STALL, or ACK with null or zero length data responses are a deviation from the USB Print Class definitions?

At step 430 in FIG. 6A, the USB printer class protocol driver on the host receives the NAK response, STALL response, or ACK with null or zero length data with null or zero length data response generated by the USB printer class interface on the application specific USB peripheral at step 425. Accordingly, there is no instantiation of a printer object that is associated with the application specific USB peripheral on the host. The USB printer class protocol driver on the host does not attach to a printer object because of the NAK response, STALL response, or ACK with null or zero length data response that results in the host not having an identified printer name/make/model, which is established in the GET_DEVICE_ID request. The NAK response to the GET_DEVICE_ID request indicates cannot send data—no response to the GET_DEVICE_ID so that the host cannot identify the printer. The STALL response to the GET_DEVICE_ID request indicates to the host that the GET_DEVICE_ID request is not supported so that the host cannot identify the printer. The ACK response with null data or zero length data to the GET_DEVICE_ID request does not indicate a printer name/make/model to the host so that the host cannot identify the printer.

Because no printer object is associated with the application specific USB peripheral (aka "No Printer Attached") a partially instantiated printer driver stack is created at step 435. The partially instantiated printer driver stack means that a printer object is not instantiated at the top of the partially instantiated printer driver stack and software such as a printer object, language monitors, print spooler, printer driver, printer sharing software, and other printer support software, are not operatively included in the partially instantiated printer driver stack.

In exemplary method 400, the process of PnP enumeration includes steps 405, 410, 415, 420, 425. The response(s) of the USB printer class interface of application specific USB peripheral at step 425 alters the process of PnP enumeration to produce the "No Printer Attached" condition at step 430 and the partially instantiated printer driver stack at step 435.

The responses of the application specific USB peripheral at steps 415, 425 are generated by the USB printer class interface, which is incorporated in the application specific USB peripheral. The USB printer class interface is designed to generate the responses of steps 415, 425, in various implementations. Exemplary responses from the USB printer class interface on the application specific USB peripheral generated at steps 415, 425 in response to the query from the host OS at step 410 are given as USB descriptors in Table 2.

TABLE 2

Handshake Responses From the USB Printer Class Interface As USB Descriptors

| Device Descriptor | |
| --- | --- |
| bcdUSB | 0x0200 |
| bDeviceClass | 0x00 |
| bDeviceSubClass | 0x00 |
| bDeviceProtocol | 0x00 |
| bMaxPacketSize0 | 0x08 (8) |
| idVendor | 0x10EF |
| idProduct | 0x0050 |
| bcdDevice | 0x0000 |
| iManufacturer | 0x01 |
| 0x0409 | "CONNEXWORX, LLC" |
| iProduct | 0x02 |
| 0x0409 | "Model U5A05T1 Rev. A" |
| iSerialNumber | 0x03 |
| 0x0409 | "0123456" |
| bNumConfigurations | 0x01 |
| Configuration Descriptor | |
| wTotalLength | 0x0020 |
| bNumInterfaces | 0x01 |
| bConfigurationValue | 0x01 |
| iConfiguration | 0x00 |
| bmAttributes | 0x80 (Bus Powered) |
| MaxPower | 0x7D (250 mA) |
| Interface Descriptor | |
| bInterfaceNumber | 0x00 |
| bAlternateSetting | 0x00 |
| bNumEndpoints | 0x02 |
| bInterfaceClass | 0x07 |
| bInterfaceSubClass | 0x01 |
| bInterfaceProtocol | 0x02 |
| iInterface | 0x00 |
| Endpoint Descriptor | |
| bEndpointAddress | 0x01 OUT (Address 1) |
| Transfer Type | Bulk |
| wMaxPacketSize | 0x0040 (64) |
| bInterval | 0x01 |
| bEndpointAddress | 0x81 IN (Address 1) |
| Transfer Type | Bulk |
| wMaxPacketSize | 0x0040 (64) |
| bInterval | 0x01 |

In this example, the responses communicated by the application specific USB peripheral to the host in response to the standard request query at step 410 include the USB definition of the application specific USB peripheral to the host OS. The application specific USB peripheral's USB descriptors tell the host OS what kind of device the application specific USB peripheral is (i.e., the USB device class of the application specific USB peripheral). There are, per this example, five different types of USB descriptors as illustrated in the example of Table 2:
 1. Device Descriptor
 2. Configuration Descriptor
 3. Interface Descriptor
 4. USB Endpoint Descriptors
 5. Strings (referenced in the Device Descriptor)

In the example of Table 2, the application specific USB peripheral responses to the host include descriptors that define the USB device class (a USB printer class device—USB class code 0x07 hexadecimal), the configurations the application specific USB peripheral supports, the USB interface definition of the application specific USB peripheral, the USB endpoint configuration(s) of the application specific USB peripheral (i.e. pipe definitions), and text character strings such as the device manufacturer name ("CONNEXWORX, LLC"), serial number ("0123456"), and the name or make/model of the application specific USB peripheral ("Model U5A05T1 Rev. A").

At step 440 of method 400, the host tunnel interface detects "No Printer Attached" condition indicative of the partially instantiated printer driver stack and the host tunnel interface attaches to the USB printer class protocol at the top of the partially instantiated printer driver stack. Examples of the host tunnel interface searching and discovering the interface to the top of the partially instantiated printer driver stack are:

Microsoft Windows USB Printer Class Device Discovery Example:
  Discover USB printer class device using Setup API functions: SetupDiGetClassDevs( )
  SetupDiEnumDeviceInterfaces( ), SetupDiGetDeviceInterfaceDetail( ), etc. searching for GUID=28D78FAD-5A12-11D1-AE5B-0000F803A8C2

Linux USB Printer Class Device Discovery Example:
  Discover USB printer class devices by stepping through the OS USB device list "/dev/usb/lp0", "/dev/usb/lp1", "/dev/usb/lp2", etc. or "/dev/bus/usb/_x/_y" where _x and _y are cardinal numbers 000, 001, 002, 003 etc.

Apple Mac OS X USB Printer Class Device Discovery Example:
  Discover USB printer class devices using IOServiceMatching( ) IOUSBDevice, IOUSBDeviceInterface, etc.

The host tunnel interface then identifies the application specific USB peripheral at step 445, which is illustrated in FIG. 6B. Method 400 passes from step 440 to connection point 441 in FIG. 6A and from connection point 441 to step 445 in FIG. 6B. Connection point 441 is a graphical element common to both FIG. 6A and FIG. 6B provided to link FIG. 6A with FIG. 6B.

The host tunnel interface may identify the application specific USB peripheral at step 445 using application specific USB peripheral descriptors such as the USB vendor (idVendor) and USB product (idProduct) identifiers (see Table 2). Host OS may identify the application specific USB peripheral at step 445 using other Application specific USB peripheral descriptors, such as iManufacturer, iProduct, iSerialNumber (see Table 2), in various implementations.

The host tunnel interface may identify the application specific USB peripheral at step 445 by using challenge/response identification including other special data communications to/from the application specific USB peripheral whereby the application specific USB peripheral responds to the host in a predetermined way. Challenge/Response identification may be performed, for example, by transmitting predefined data from the host tunnel interface on the host to the device tunnel interface on the application specific USB peripheral. The predefined data is then recognized by the device tunnel interface in the application specific USB peripheral. The device tunnel interface in the application specific USB peripheral sends a response to the host tunnel interface, the response including predefined data. The host tunnel interface recognizes the predefined data (i.e., the device is identified) or the host does not recognize the predefined data (i.e., the device is rejected or ignored).

Figure 7:
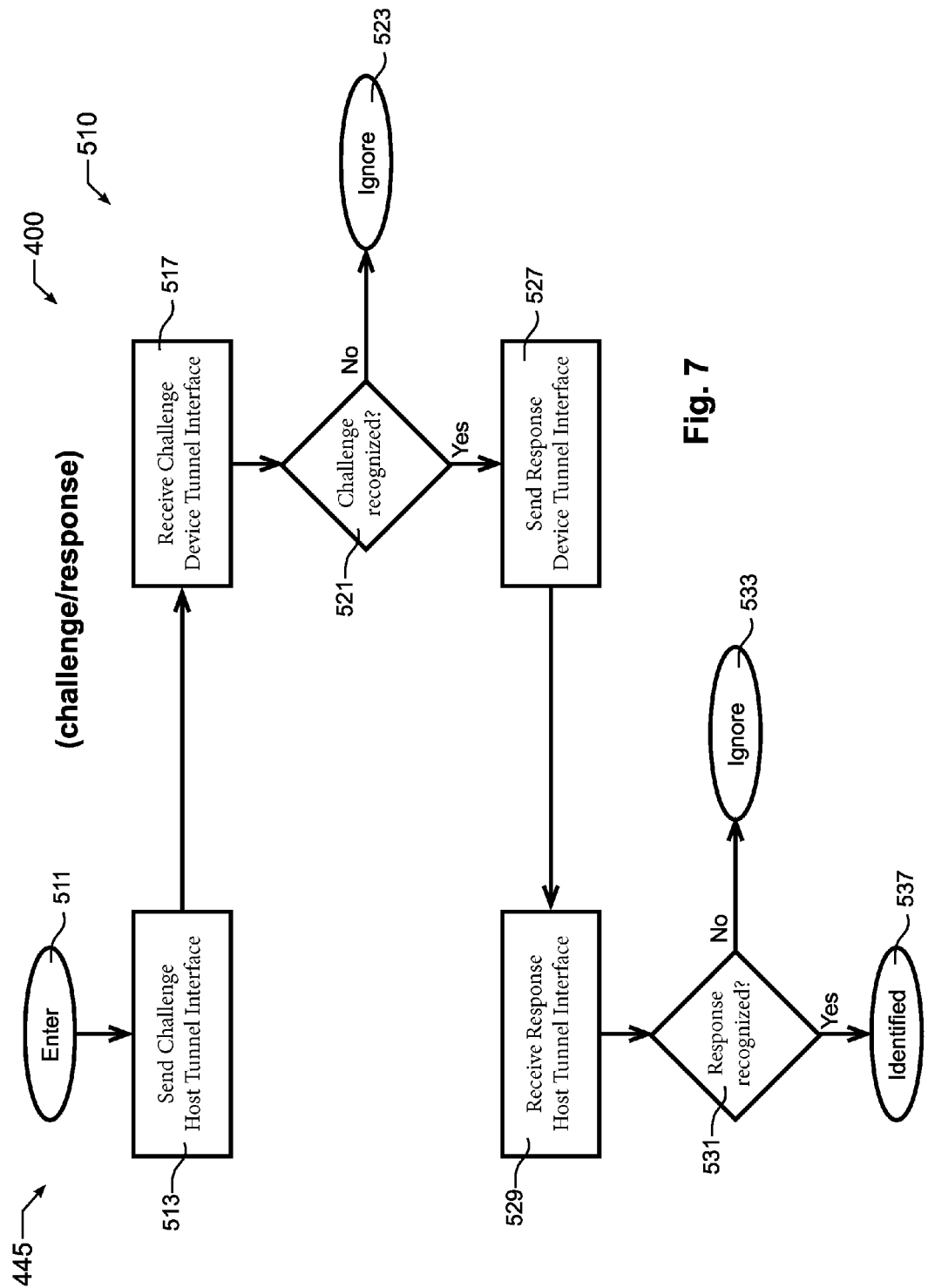
FIG. 7 illustrates by process flow chart an exemplary implementation of portions of the exemplary method of creating an exemplary USB tunnel apparatus of FIGS. 6A and 6B.

FIG. 7 illustrates method 510, which is an implementation of step 445 of method 400 using challenge/response. Method 510 is entered at step 511. As illustrated in FIG. 7, the host tunnel interface on the host sends data (the challenge) to the device tunnel interface on the application specific USB peripheral at step 513. The device tunnel interface receives the data (the challenge) at step 517. If the device tunnel interface recognizes the data (the challenge) at step 521, method 510 branches from step 521 to step 527. At step 527, the device tunnel interface sends data (the response) to the host tunnel interface. If the device tunnel interface does not recognize the data (the challenge) at step 521, method 510 branches from step 521 to step 523. At step 523 the device tunnel interface ignores the data (the challenge) and does not send data (a response) to the host.

At step 529, the host tunnel interface on the host receives the data (the response). If the host tunnel interface recognizes the data (the response) at step 531, method 510 branches from step 531 to step 537. The application specific USB peripheral is then identified at step 537. If the host tunnel interface does not recognize the data (the response) at step 531, method 510 branches from step 531 to step 533. At step 523 the host tunnel interface ignores the data (the response) and considers the application specific USB peripheral as unidentified.

The host tunnel interface may identify the application specific USB peripheral at step 445 by transmitting random or fixed data to the device tunnel interface on application specific USB peripheral. The device tunnel interface of the application specific USB peripheral then passes the random or fixed data through a known (or shared) transform algorithm thereby creating transformed data. The device tunnel interface responds by sending the transformed data to the host tunnel interface. The host tunnel interface determines if the transformed data is valid by verifying the transformed data returned by the USB peripheral against the identical transform of the random or fixed data on the host. Correspondence between the transformed data and the random or fixed data indicates recognition of the application specific USB peripheral (i.e., the device is identified).

Figure 8:
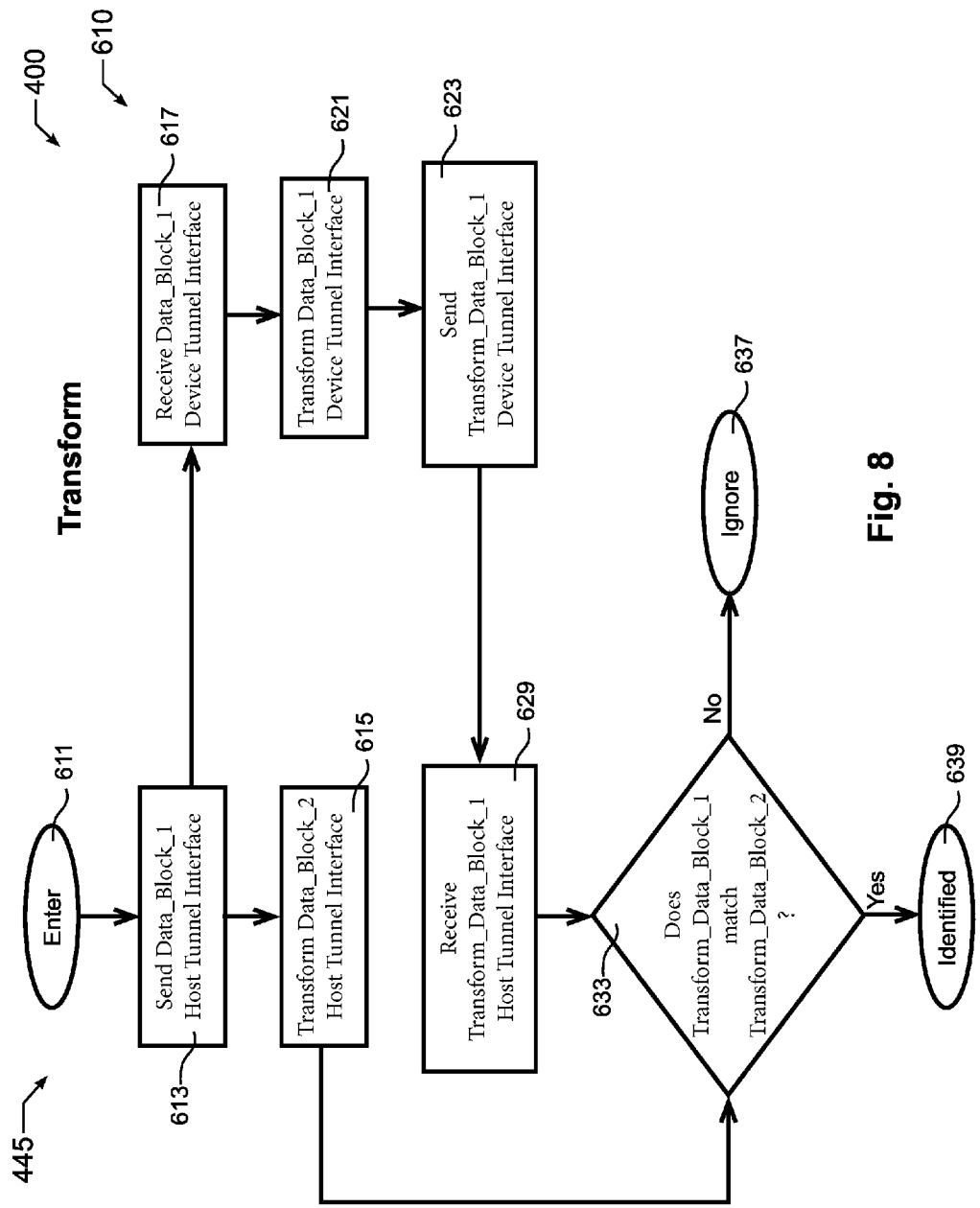
FIG. 8 illustrates by process flow chart another exemplary implementation of portions of the exemplary method of creating an exemplary USB tunnel apparatus of FIGS. 6A and 6B; and, FIG. 9 illustrates by process flow chart an exemplary implementation of portions of the exemplary method of creating an exemplary USB tunnel apparatus of FIGS. 6A and 6B.

FIG. 8 illustrates method 610, which is an implementation of step 445 of method 400 using a transform algorithm. Method 610 is entered at step 611. As illustrated in FIG. 8, the host tunnel interface on the host sends data_block_1 to the device tunnel interface on the application specific USB peripheral at step 613. The device tunnel interface receives data_block_1 at step 617. The device tunnel interface transforms data_block_1 into transform_data_block_1 using a transform algorithm at step 621. At step 623, the device tunnel interface sends transform_data_block_1 to the host tunnel interface. The host tunnel interface receives transform_data_block_1 at step 629.

At step 615 of method 610, the host tunnel interface transforms data_block_1 into transforms_data_block_2 using the transform algorithm. Then, at step 633, the host tunnel interface compares transforms_data_block_1 with transforms_data_block_2. If transforms_data_block_1 matches transforms_data_block_2, method 610 branches from step 633 to step 639 and the application specific peripheral is identified by the host tunnel interface on the host. If transform_data_block_1 does not matches transform_data_block_2, method 610 branches from step 633 to step 639 and the application specific peripheral is ignored by the host tunnel interface on the host.

For example, the data_block may be "112233" and the transform algorithm used by both the host tunnel interface and the device tunnel interface is "add 1 to each digit of the data_block." Then, according to this example, transforms_data_block_1 is "223344" and transforms_data_block_2 is "223344."

The host tunnel interface may identify the application specific USB peripheral at step 445 by transmitting data utilizing a cryptographic one-way hash function to the device tunnel interface on application specific USB peripheral. The device tunnel interface of the application specific USB peripheral then responds by returning the digest resulting from performing the cryptographic one-way has function to host OS to be validated, thus identifying the application specific USB peripheral. Data to be cryptographically hashed by application specific USB peripheral may be random or statically generated (i.e., a fixed predetermined data) and may include data sources such as: USB descriptors strings or identifiers including "iManufacturer", "iProduct", "iSerialNumber", "idVendor", or "idProduct" used alone or in combination. A randomized cryptographic "salt" value may be used alone or in combination with the data to be hashed. Multiple one-way hash algorithms or codes can be used.

The host tunnel interface may identify the application specific USB peripheral at step 445 using various cryptographic encryption key exchange methods, for example:
Diffie-Hellman key exchange
Public Key Infrastructure (PKI), X.509 certificates
PGP key exchange At step 450, the host tunnel interface assigns a unique instance ID to the application specific USB peripheral, for example, to support implementations having more than one application specific USB peripheral simultaneously connected to the host. The instance ID may be used in communications through the printer class tunnel. The host tunnel interface may assign the instance ID to the application specific USB peripheral, for example, by:
Incrementing unique integer number for each Application specific USB peripheral identified (0, 1, 2, 3, . . . ) attached to the host
A randomly generated integer number unique for each application specific USB peripheral attached to the host
Using the unique hash code of Application specific USB peripheral descriptor information such as: "idVendor", "idProduct", "iManufacturer", "iProduct", or "iSerialNumber" used in any combination or singularly.
Using unique information obtained from host OS such as: device object handle, Globally Unique Identifier (GUID), device instance ID, etc.

The Application specific USB peripheral serial number ("iSerialNumber") may be retained by the host tunnel interface to allow the user to identify a specific application specific USB peripheral when multiple application specific USB peripherals are simultaneously connected to the host. The Application specific USB peripheral may be labeled with the Application specific USB peripheral's serial number in various ways that enable the user to physically identify the specific application specific USB peripheral.

At step 455, the host tunnel interface opens or establishes a connection to the bulk OUT pipe, and the host tunnel interface optionally opens or establishes a connection the bulk IN pipe between the host and the application specific USB peripheral.

At step 460, the host tunnel interface connects with the application specific controller or the application specific controller connects with the host tunnel interface. Accordingly, the application specific controller communicates through the host tunnel interface to the USB printer class protocol driver at the top of the partially instantiated printer driver stack. In some implementations, host tunnel interface may activate the application specific controller as part of connecting to the application specific controller.

At step 465, the application specific controller on the host communicates with the application specific logic on the application specific USB peripheral. Data may be communicated between the application specific controller on the host and the application specific logic on the application specific USB peripheral through the printer class tunnel via the default pipe, the bulk OUT pipe, and, optionally, the bulk IN pipe.

Note that it may be required to break the data into USB packets having a size defined by "wMaxPacketSize" in the endpoint descriptor (see Table 2). The size of the USB packet may be 64 bytes, in various implementations.

The application specific controller is terminated at step 466. Method 400 terminates at step 467.

The USB protocol specifications define different packet types for data exchanges between Host Computer and USB Device. There are differences in supported packet types between the different USB specifications USB 1.0, USB 2.0 and USB 3.0, whereby later versions of the USB specification build on earlier versions and add USB packet identifiers. For example, USB 2.0 adds packet types not found in USB 1.0 specification. In this disclosure, USB 2.0 is considered the baseline.

TABLE 3

USB packet types defined by a packet identifier (PID)

| PID Type  | PID Name | PID<3:0>* |
|-----------|----------|-----------|
| Token     | OUT      | 0001b     |
|           | IN       | 1001b     |
|           | SOF      | 0101b     |
|           | SETUP    | 1101b     |
| Data      | DATA0    | 0011b     |
|           | DATA1    | 1011b     |
|           | DATA2    | 0111b     |
|           | MDATA    | 1111b     |
| Handshake | ACK      | 0010b     |
|           | NAK      | 1010b     |
|           | STALL    | 1110b     |
|           | NYET     | 0110b     |
| Special   | PRE      | 1100b     |
|           | ERR      | 1100b     |
|           | SPLIT    | 1000b     |
|           | PING     | 1000b     |
|           | Reserved | 0000b     |

ACK handshake response packet is sent when the receiving device acknowledges receiving an error free packet.
NAK handshake response packet is sent when the receiving device cannot accept data or the transmitting device cannot send data.
STALL handshake response packet means the endpoint is halted or a control pipe request is not supported.

Methods disclosed herein may include the step of connecting the application specific USB peripheral to the host using the USB communications medium. Methods disclosed herein may include the step of providing the USB printer class interface on the application specific USB peripheral, the step of providing the host tunnel interface on the host, and the step of providing the application specific controller on the host. Methods disclosed herein may include the step of configuring the USB printer class interface to identify the application specific USB peripheral as a printer class device. Methods disclosed herein may include the step of configuring the USB printer class interface on application specific USB peripheral to alter the process of PnP enumeration thereby creating a partially instantiated printer driver stack on the host. Methods disclosed herein may include the step of configuring the USB printer class interface to generate a response selected from NAK response (receiving device cannot accept data or transmitting device cannot send data), STALL response (endpoint is halted or control pipe request is not supported), or Null Data response (ACK acknowledge response with null data or zero length data) to alter the process of PnP enumeration.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A non-transitory computer readable media storing a computer program comprising instructions that, when executed, cause a computer to perform the steps of:
    identifying an application specific USB peripheral as a USB printer class device with USB class code 0x07 hexadecimal to a host during Plug and Play enumeration; and
    generating a response during Plug and Play enumeration that alters the process of PnP enumeration thereby creating a partially instantiated printer driver stack on the host, the partially instantiated printer driver stack includes a USB printer class protocol driver (USB class code 0x07 hexadecimal) with all components above the USB printer class protocol driver including printer object, printer language, print spooler, and printer driver blocked from instantiation.

2. The composition of matter of claim 1, further comprising instructions that, when executed, cause the computer to perform the step of:
    communicating data between the application specific USB peripheral and the host by passing the data through the partially instantiated printer driver stack.

3. The composition of matter of claim 2, the data having no restriction as to the semantics, type, or size.

4. The composition of matter of claim 2, further comprising instructions that, when executed, cause the computer to perform the step of: encoding the data using a cryptographic cipher.

5. The composition of matter of claim 1, wherein the response generated during Plug and Play enumeration is selected from NAK, STALL, or ACK with null data or zero length data.

6. The composition of matter of claim 1, further comprising instructions that, when executed, cause the computer to perform the steps of:
    communicating data between a device tunnel interface operatively received on the application specific USB peripheral and a host tunnel interface operatively received on the host, the data passing through the partially instantiated printer driver stack.

7. The composition of matter of claim 1, the computer uses a USB printer class interface included on the application specific USB peripheral in performing the step of identifying an application specific USB peripheral as a USB printer class device with USB class code 0x07 hexadecimal to a host during Plug and Play enumeration;
    and the computer uses the USB printer class interface in performing the step of generating a response during Plug and Play enumeration that alters the process of PnP enumeration thereby creating a partially instantiated printer driver stack on the host.

8. The composition of matter of claim 1, further comprising instructions that, when executed, cause the computer to perform the step of:
    communicating data between an application specific controller operatively received on the host and application specific logic operatively received on the application specific USB peripheral, the data communicated through the partially instantiated printer driver stack.

9. The composition of matter of claim 1, further comprising instructions that, when executed, cause the computer to perform the step of:
    carrying out the function of the application specific USB peripheral at least in part using instructions comprising application specific logic operatively received on the application specific USB peripheral cooperating with application specific circuitry received upon the application specific USB peripheral.

10. The composition of matter of claim 9, further comprising instructions that, when executed, cause the computer to perform the step of:
    communicating data through the partially instantiated printer driver stack, the data being communicated between the application specific logic and an application specific controller operably received upon the host.

11. The composition of matter of claim 9, further comprising instructions that, when executed, cause the computer to perform the step of:
    sending data from an application specific controller through the partially instantiated printer driver stack to the application specific logic thereby controlling operations of the application specific circuitry.

12. The composition of matter of claim 9, further comprising instructions that, when executed, cause the computer to perform the steps of:
    obtaining data obtained from the application specific circuitry by the application specific logic; and
    sending the data through the partially instantiated printer driver stack.

13. The composition of matter of claim 12, wherein the data obtained from the application specific circuitry is generated at least in part by operations of the application specific circuitry.

14. A method comprising the steps of:
    identifying an application specific USB peripheral as a USB printer class device with USB class code 0x07 hexadecimal to a host during Plug and Play enumeration;
    generating a response during Plug and Play enumeration that alters the process of PnP enumeration thereby creating a partially instantiated printer driver stack on the host, the partially instantiated printer driver stack includes a USB printer class protocol driver (USB class code 0x07 hexadecimal) with all components above the USB printer class protocol driver including printer object, printer language, print spooler, and printer driver blocked from instantiation; and
    communicating data between the application specific USB peripheral and the host by passing the data through the partially instantiated printer driver stack.

15. The method of claim 14, the data having no restriction as to the semantics, type, or size.

* * * * *